US009423786B2

(12) United States Patent
Imada et al.

(10) Patent No.: US 9,423,786 B2
(45) Date of Patent: Aug. 23, 2016

(54) MOTOR DRIVE DEVICE

(71) Applicant: Panasonic Intellectual Property Management Co., Ltd., Osaka (JP)

(72) Inventors: Yu-Suke Imada, Osaka (JP); Kenichi Suzuki, Osaka (JP); Masaru Nishizono, Osaka (JP); Hiroshi Fujiwara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/782,596

(22) PCT Filed: Apr. 9, 2014

(86) PCT No.: PCT/JP2014/002035
§ 371 (c)(1),
(2) Date: Oct. 5, 2015

(87) PCT Pub. No.: WO2014/167851
PCT Pub. Date: Oct. 16, 2014

(65) Prior Publication Data
US 2016/0070252 A1 Mar. 10, 2016

(30) Foreign Application Priority Data

Apr. 10, 2013 (JP) ................................ 2013-081918

(51) Int. Cl.
*G05B 13/00* (2006.01)
*G05B 19/416* (2006.01)
(Continued)

(52) U.S. Cl.
CPC ......... *G05B 19/404* (2013.01); *G05B 13/0265* (2013.01); *G05B 15/02* (2013.01); *G05D 3/20* (2013.01); *H02P 6/00* (2013.01); *H02P 29/00* (2013.01); *G05B 19/416* (2013.01)

(58) Field of Classification Search
CPC  G05B 19/404; G05B 13/0265; G05B 15/02; G05B 19/416; H02P 29/00; H02P 6/00; G05D 3/20

USPC ........................................................ 318/561
See application file for complete search history.

(56) References Cited

U.S. PATENT DOCUMENTS 5,475,291 A   12/1995 Yoshida et al.
5,786,678 A    7/1998 Kobayashi et al.
(Continued)

FOREIGN PATENT DOCUMENTS

EP    0601432    6/1994
EP    2571159    3/2013
(Continued)

OTHER PUBLICATIONS

International Search Report of PCT application No. PCT/JP2014/002035 dated Jun. 17, 2014.
(Continued)

*Primary Examiner* — Bentsu Ro
*Assistant Examiner* — Zemenay Truneh
(74) *Attorney, Agent, or Firm* — Hamre, Schumann, Mueller & Larson, P.C.

(57) ABSTRACT

A motor drive device (2) of the present invention includes a command response setting unit (22), a position and speed controller (23), a load characteristic compensator (24), a servo adjuster (6), a command response setting function (221), a stiffness setting function (231), an evaluation indicator measuring function (27), and a storage (28). The servo adjuster (6) stores a plurality of command response indicators (61) and a plurality of stiffness indicators (62). The servo adjuster (6) also generates an evaluation indicator measuring pattern (63) by a combination of each command response indicator (61) and each stiffness indicator (62). A motor (3) is driven in accordance with the generated evaluation indicator measuring pattern (63) while the command response indicators (61) and the stiffness indicators (62) are sequentially changed.

14 Claims, 28 Drawing Sheets

(51) Int. Cl.
  *G05B 19/404* (2006.01)
  *H02P 29/00* (2016.01)
  *H02P 6/00* (2016.01)
  *G05B 13/02* (2006.01)
  *G05B 15/02* (2006.01)
  *G05D 3/20* (2006.01)

(56) References Cited

U.S. PATENT DOCUMENTS

| | | | |
|---|---|---|---|
| 6,084,374 A * | 7/2000 | Nakatsuka | B25J 9/1638 318/568.1 |
| 2010/0052593 A1 | 3/2010 | Kishimoto et al. | |
| 2010/0333010 A1 | 12/2010 | Yamaichi et al. | |
| 2012/0268054 A1 | 10/2012 | Kishimoto et al. | |

FOREIGN PATENT DOCUMENTS

| | | |
|---|---|---|
| JP | 5-346359 | 12/1993 |
| JP | 6-319284 | 11/1994 |
| JP | 2004-274976 | 9/2004 |
| JP | 2005-168166 | 6/2005 |
| JP | 2006-254630 | 9/2006 |
| JP | 2007-034781 | 2/2007 |
| JP | 2007-336792 | 12/2007 |
| WO | 2008/087893 | 7/2008 |
| WO | 2009/096169 | 8/2009 |

OTHER PUBLICATIONS

The Extended European Search Report for the related European Patent Application No. 14783045.9 dated Mar. 15, 2016, (5 pages).

* cited by examiner

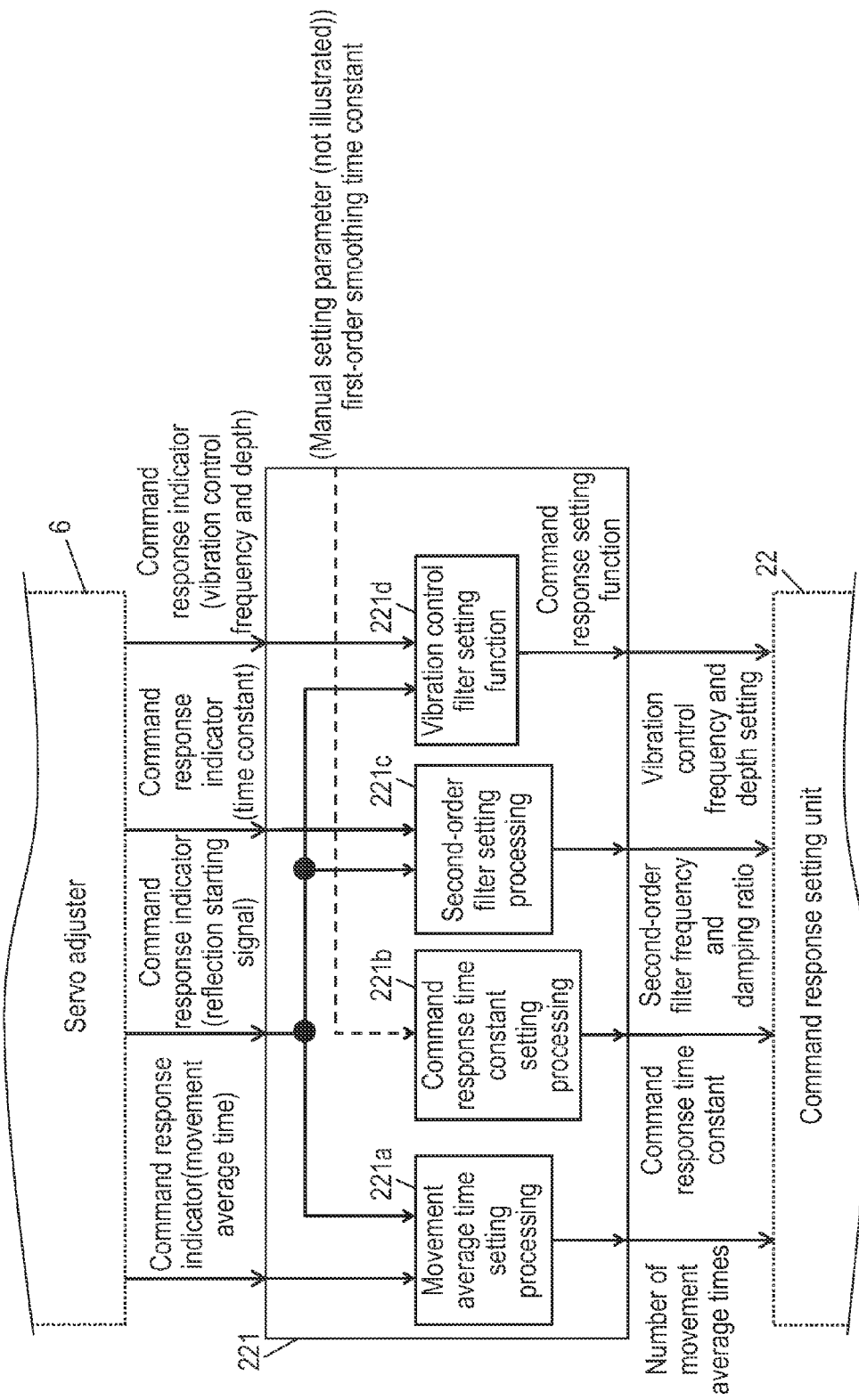

FIG. 7B

| Stiffness indicator | Kp(1/s) | Kvp(Hz) | Ti(ms) | TF(ms) |
|---|---|---|---|---|
| 0 | 2 | 1.5 | 370 | 15 |
| 1 | 2.5 | 2 | 280 | 11 |
| 2 | 3 | 2.5 | 220 | 9 |
| 3 | 4 | 3 | 190 | 8 |
| 4 | 4.5 | 3.5 | 160 | 6 |
| 5 | 5.5 | 4.5 | 120 | 5 |
| 6 | 7.5 | 6 | 90 | 4 |
| 7 | 9.5 | 7.5 | 70 | 3 |
| 8 | 11.5 | 9 | 60 | 3 |
| 9 | 14 | 11 | 50 | 2 |
| 10 | 17.5 | 14 | 40 | 2 |
| 11 | 32 | 18 | 31 | 1.26 |
| 12 | 39 | 22 | 25 | 1.03 |
| 13 | 48 | 27 | 21 | 0.84 |
| 14 | 63 | 35 | 16 | 0.65 |
| 15 | 72 | 40 | 14 | 0.57 |
| 16 | 90 | 50 | 12 | 0.45 |
| 17 | 108 | 60 | 11 | 0.38 |
| 18 | 135 | 75 | 9 | 0.3 |
| 19 | 162 | 90 | 8 | 0.25 |
| 20 | 206 | 115 | 7 | 0.2 |
| 21 | 251 | 140 | 6 | 0.16 |
| 22 | 305 | 170 | 5 | 0.13 |
| 23 | 377 | 210 | 4 | 0.11 |
| 24 | 449 | 250 | 4 | 0.09 |
| 25 | 500 | 280 | 3.5 | 0.08 |
| 26 | 560 | 310 | 3 | 0.07 |
| 27 | 610 | 340 | 3 | 0.07 |
| 28 | 660 | 370 | 2.5 | 0.06 |
| 29 | 720 | 400 | 2.5 | 0.06 |
| 30 | 810 | 450 | 2 | 0.05 |
| 31 | 900 | 500 | 2 | 0.05 |

— 231a

Kp: Position loop gain
Kvp: Speed loop gain
Ti: Speed loop integral time constant
TF: Torque filter time constant

FIG. 10A

| Maximum stiffness | Command response indicator No.1 | Command response indicator No.2 | | | Command response indicator No.6 |
|---|---|---|---|---|---|
| 0 | 1919 | 768 | | | 267 |
| 1 | 1487 | 595 | | | 198 |
| 2 | 1214 | 486 | | | 158 |
| 3 | 960 | 384 | | | 131 |
| 4 | 838 | 335 | | | 107 |
| 5 | 668 | 267 | | | 85 |
| 6 | 496 | 198 | | | 55 |
| 7 | 394 | 158 | | | 45 |
| 8 | 327 | 131 | | | 37 |
| 9 | 268 | 107 | | | 28 |
| 10 | 212 | 85 | | | 25 |
| 11 | 139 | 55 | | | 20 |
| 12 | 113 | 45 | | | 17 |
| 13 | 92 | 37 | | | 13 |
| 14 | 71 | 28 | | | 11 |
| 15 | 62 | 25 | | | 9 |
| 16 | 50 | 20 | | | 7 |
| 17 | 41 | 17 | | | 6 |
| 18 | 33 | 13 | | | 5 |
| 19 | 28 | 11 | | | 4 |
| 20 | 22 | 9 | | | 4 |
| 21 | 18 | 7 | | | 3 |
| 22 | 15 | 6 | | | 3 |
| 23 | 12 | 5 | | | 3 |
| 24 | 10 | 4 | | | 2 |
| 25 | 9 | 4 | | | 2 |
| 26 | 8 | 3 | | | 2 |
| 27 | 7 | 3 | | | 1 |
| 28 | 7 | 3 | | | 1 |
| 29 | 6 | 2 | | | 1 |
| 30 | 6 | 2 | | | 1 |
| 31 | 5 | 2 | | | 1 |

FIG. 11A

| Maximum stiffness | Command response indicator No.1 | Command response indicator No.2 | | Command response indicator No.6 |
|---|---|---|---|---|
| 0 | 1919 | 768 | | 267 |
| 1 | 1487 | 595 | | 198 |
| 2 | 1214 | 486 | | 158 |
| 3 | 960 | 384 | | 131 |
| 4 | 838 | 335 | | 107 |
| 5 | 668 | 267 | | 85 |
| 6 | 496 | 198 | | 55 |
| 7 | 394 | 158 | | 45 |
| 8 | 327 | 131 | | 37 |
| 9 | 268 | 107 | | 28 |
| 10 | 212 | 85 | | 25 |
| 11 | 139 | 55 | | 20 |
| 12 | 113 | 45 | | 17 |
| 13 | 92 | 37 | | 13 |
| 14 | 71 | 28 | | 11 |
| 15 | 62 | 25 | | 9 |
| 16 | 50 | 20 | | 7 |
| 17 | 41 | 17 | | 6 |
| 18 | 33 | 13 | | 5 |
| 19 | 28 | 11 | | 4 |
| 20 | 22 | 9 | | 4 |
| 21 | 18 | 7 | | 3 |
| 22 | 15 | 6 | | 3 |
| 23 | 12 | 5 | | 3 |
| 24 | 10 | 4 | | 2 |
| 25 | 9 | 4 | | 2 |
| 26 | 8 | 3 | | 2 |
| 27 | 7 | 3 | | 1 |
| 28 | 7 | 3 | | 1 |
| 29 | 6 | 2 | | 1 |
| 30 | 6 | 2 | | 1 |
| 31 | 5 | 2 | | 1 |

FIG. 12A

| Maximum stiffness | Command response indicator No.1 | Command response indicator No.2 | | | Command response indicator No.6 |
|---|---|---|---|---|---|
| 0 | 1919 | 768 | | | 267 |
| 1 | 1487 | 595 | | | 198 |
| 2 | 1214 | 486 | | | 158 |
| 3 | 960 | 384 | | | 131 |
| 4 | 838 | 335 | | | 107 |
| 5 | 668 | 267 | | | 85 |
| 6 | 496 | 198 | | | 55 |
| 7 | 394 | 158 | | | 45 |
| 8 | 327 | 131 | | | 37 |
| 9 | 268 | 107 | | | 28 |
| 10 | 212 | 85 | | | 25 |
| 11 | 139 | 55 | | | 20 |
| 12 | 113 | 45 | | | 17 |
| 13 | 92 | 37 | | | 13 |
| 14 | 71 | 28 | | | 11 |
| 15 | 62 | 25 | | | 9 |
| 16 | 50 | 20 | | | 7 |
| 17 | 41 | 17 | | | 6 |
| 18 | 33 | 13 | | | 5 |
| 19 | 28 | 11 | | | 4 |
| 20 | 22 | 9 | | | 4 |
| 21 | 18 | 7 | | | 3 |
| 22 | 15 | 6 | | | 3 |
| 23 | 12 | 5 | | | 3 |
| 24 | 10 | 4 | | | 2 |
| 25 | 9 | 4 | | | 2 |
| 26 | 8 | 3 | | | 2 |
| 27 | 7 | 3 | | | 1 |
| 28 | 7 | 3 | | | 1 |
| 29 | 6 | 2 | | | 1 |
| 30 | 6 | 2 | | | 1 |
| 31 | 5 | 2 | | | 1 |

FIG. 13A

| Maximum stiffness | Command response indicator No.1 | Command response indicator No.2 | Command response indicator No.6 |
|---|---|---|---|
| 0 | 1919 | 768 | 267 |
| 1 | 1487 | 595 | 198 |
| 2 | 1214 | 486 | 158 |
| 3 | 960 | 384 | 131 |
| 4 | 838 | 335 | 107 |
| 5 | 668 | 267 | 85 |
| 6 | 496 | 198 | 55 |
| 7 | 394 | 158 | 45 |
| 8 | 327 | 131 | 37 |
| 9 | 268 | 107 | 28 |
| 10 | 212 | 85 | 25 |
| 11 | 139 | 55 | 20 |
| 12 | 113 | 45 | 17 |
| 13 | 92 | 37 | 13 |
| 14 | 71 | 28 | 11 |
| 15 | 62 | 25 | 9 |
| 16 | 50 | 20 | 7 |
| 17 | 41 | 17 | 6 |
| 18 | 33 | 13 | 5 |
| 19 | 28 | 11 | 4 |
| 20 | 22 | 9 | 4 |
| 21 | 18 | 7 | 3 |
| 22 | 15 | 6 | 3 |
| 23 | 12 | 5 | 3 |
| 24 | 10 | 4 | 2 |
| 25 | 9 | 4 | 2 |
| 26 | 8 | 3 | 2 |
| 27 | 7 | 3 | 1 |
| 28 | 7 | 3 | 1 |
| 29 | 6 | 2 | 1 |
| 30 | 6 | 2 | 1 |
| 31 | 5 | 2 | 1 |

FIG. 17A

| Maximum stiffness | Command response indicator No.1 | Command response indicator No.2 | | Command response indicator No.6 |
|---|---|---|---|---|
| 0 | 1919 | 768 | | 267 |
| 1 | 1487 | 595 | | 198 |
| 2 | 1214 | 486 | | 158 |
| 3 | 960 | 384 | | 131 |
| 4 | 838 | 335 | | 107 |
| 5 | 668 | 267 | | 85 |
| 6 | 496 | 198 | | 55 |
| 7 | 394 | 158 | | 45 |
| 8 | 327 | 131 | | 37 |
| 9 | 268 | 107 | | 28 |
| 10 | 212 | 85 | | 25 |
| 11 | 139 | 55 | | 20 |
| 12 | 113 | 45 | | 17 |
| 13 | 92 | 37 | | 13 |
| 14 | 71 | 28 | | 11 |
| 15 | 62 | 25 | | 9 |
| 16 | 50 | 20 | | 7 |
| 17 | 41 | 17 | | 6 |
| 18 | 33 | 13 | | 5 |
| 19 | 28 | 11 | | 4 |
| 20 | 22 | 9 | | 4 |
| 21 | 18 | 7 | | 3 |
| 22 | 15 | 6 | | 3 |
| 23 | 12 | 5 | | 3 |
| 24 | 10 | 4 | | 2 |
| 25 | 9 | 4 | | 2 |
| 26 | 8 | 3 | | 2 |
| 27 | 7 | 3 | | 1 |
| 28 | 7 | 3 | | 1 |
| 29 | 6 | 2 | | 1 |
| 30 | 6 | 2 | | 1 |
| 31 | 5 | 2 | | 1 | ns
MOTOR DRIVE DEVICE

CROSS-REFERENCE TO RELATED APPLICATIONS

This application is a U.S. national stage application of the PCT International Application No. PCT/JP2014/002035 filed on Apr. 9, 2014, which claims the benefit of foreign priority of Japanese patent application 2013-081918 filed on Apr. 10, 2013, the contents all of which are incorporated herein by reference.

TECHNICAL FIELD

The present invention relates to a motor drive device that controls a servo motor, particularly to servo adjustment.

BACKGROUND ART

Recently, performance of a built-in microcomputer has been enhanced. There has been also developed an integrated circuit in which a customizable element is combined with a conventional ASIC (Application Specific Integrated Circuit). Examples of the built-in microcomputer include a RISC microcomputer (Reduced Instruction Set Computer-microcomputer) and a DSP (Digital Signal Processor). Examples of the integrated circuit include an FPGA (Field Programmable Gate Array) and an SoC (System-on-a-Chip).

Currently, using the built-in microcomputer and the integrated circuit, a motor drive device includes various automatic adjustment functions in addition to a basic function when driving the servo motor based on an external command. As used herein, the basic function means position control, speed control, and current control in which drive of a servo motor is controlled.

FIG. 19 is a block diagram illustrating a conventional motor drive device.

As illustrated in FIG. 19, motor drive device 1002 includes the basic function of controlling the drive of motor 3. In FIG. 19, basic performance is implemented by the following flow in which blocks are connected to each other by a solid line using a block surrounded by a singlet.

Host device 1 transmits an external position command to motor drive device 1002. The external position command transmitted from the host device 1 is received by command selector 21 of motor drive device 1002. Command selector 21 selects one of internal position command transmitted from test run function 211 (to be described later) and the external position command transmitted from host device 1. Command selector 21 transmits one of the internal position command and the external position command, which is selected by command selector 21, to command response setting unit 22 as a post-selection position command.

Command response setting unit 22 performs filter calculation processing on the post-selection position command. After performing the filter calculation processing in command response setting unit 22, command response setting unit 22 transmits a result of the filter calculation processing to position and speed controller 23 as a post-filter position command.

Position and speed controller 23 performs a feedback control calculation using the received post-selection position command and motor positional information transmitted from encoder 4. A feedback control calculation is typified by PID control (Proportional Integral Derivative Controller). After performing the feedback control calculation in position and speed controller 23, position and speed controller 23 transmits a torque command to load characteristic compensator 24 such that a position deviation becomes zero.

Load characteristic compensator 24 performs scaling processing on the torque command transmitted from position and speed controller 23 in accordance with total inertia. As used herein, the total inertia means inertia of the motor 3 or a load 5, and the like. Load characteristic compensator 24 performs the scaling processing to absorb a difference of load inertia.

Load characteristic compensator 24 estimates friction torques of motor 3 and load 5 from the motor positional information transmitted from encoder 4. Load characteristic compensator 24 previously adds the estimated friction torque to generate a post-compensation torque command. Load characteristic compensator 24 transmits the generated post-compensation torque command to resonance suppressor 25.

Sometimes a vibration is caused by resonance characteristics of motor 3 and load 5. Resonance suppressor 25 performs notch filter processing or low-pass filter processing of removing a specific frequency component from the post-compensation torque command such that the vibration is not excited. Resonance suppressor 25 transmits a result of the notch filter processing or low-pass filter processing to the motor 3 as a post-filter torque command.

Motor 3 is controlled through current control in which the post-filter torque command transmitted from resonance suppressor 25 is used or a power circuit. Motor 3 is controlled so as to output the same torque as the received post-filter torque command. Motion of motor 3 is transmitted to connected load 5 or encoder 4. The motion of motor 3 is fed back to motor drive device 1002 as a motor positional information through encoder 4.

As illustrated in FIG. 19, motor drive device 1002 includes an automatic adjustment function. In FIG. 19, the automatic adjustment function is implemented by the following flow in which blocks are connected to each other by a broken line using a block surrounded by a doublet.

For example, as disclosed in PTL 1, test run function 211 generates a reciprocating running pattern in motor drive device 1002. The reciprocating running pattern is a fixed amount of triangular wave having acceleration or deceleration with a certain inclination. The reciprocating running pattern has positive and negative levels.

Generally, in test run function 211, when an external parameter is set, a command pattern is automatically calculated in real time through NC calculation processing incorporated in motor drive device 1002. As used herein, the external parameter means a movement amount, a maximum speed, an acceleration time, a deceleration time, a stopping time, and the like. Test run function 211 is a function of generating the internal position command in each given period.

When the internal position command is transmitted from test run function 211 to command selector 21, test run function 211 can also transmit additional information such that command selector 21 selects the internal position command. When the additional information is transmitted, an operation of command selector 21 can be designed from test run function 211.

For example, as disclosed in PTL 2, command response setting function 221 determines a cutoff frequency of a command prefilter that determines responsiveness of a position command. One indicator called a stiffness value is provided to command response setting function 221 from the outside of motor drive device 1002. Command response setting function 221 determines the cutoff frequency of the command prefilter from the provided stiffness value and a table incorporated in motor drive device 1002.

Generally, command response setting function 221 automatically sets one or a plurality of parameters of command response setting unit 22 by receiving one or a plurality of command response indicators indicated by the following form. In some forms in which the command response indicator is received, an instruction of a finer frequency characteristic is issued with a first-order or second-order lag filter time constant or a damping ratio. In other forms in which the command response indicator is received, an instruction of transient characteristic of time response such as a rise time, a delay time, and an overshoot amount is issued. Command response setting function 221 automatically sets one or a plurality of parameters of command response setting unit 22 such that a transmission or reception relationship with command response setting unit 22 is matched with the command response indicator as much as possible.

For example, as disclosed in PTL 3, in stiffness setting function 231, one parameter typifying servo stiffness is used as the indicator. Stiffness setting function 231 multiplies one parameter typifying the servo stiffness by a given ratio to set a speed proportional gain, a speed integral gain, and a position proportional gain in synchronization with one another. As disclosed in PTL 2, a gain of a position and speed controller 23 may be set from the table corresponding to the stiffness value.

Generally, stiffness setting function 231 receives one or a plurality of stiffness indicators, and automatically sets one or a plurality of parameters of position and speed controller 23 such that a disturbance response of position and speed controller 23 is matched with the stiffness indicator as much as possible.

For example, as disclosed in PTL 4, load characteristic measuring function 241 can automatically estimate a friction characteristic from the post-filter torque command transmitted to motor 3, the motor positional information transmitted from encoder 4, and the speed and acceleration that are of a high-order difference of the motor positional information using least square estimation. As used herein, the friction characteristic means a total inertia in which inertia of motor 3, the inertia of load 5, and the like are summed up, a biased load torque which always acts constantly, a kinetic friction torque depending on an operation direction, a viscous friction torque proportional to an operation speed, and like.

Load characteristic measuring function 241 reflects the estimated result in load characteristic compensator 24 in real time. Therefore, load characteristic measuring function 241 has adaptive robustness in which the identical responsiveness designated by the command response indicator or stiffness indicator can be obtained even if any load 5 is connected to motor 3.

For example, as disclosed in PTL 5, adaptive filter function 251 automatically adjusts the parameter of resonance suppressor 25 using an adaptive algorithm, in which a recursive notch filter is used, such that a high-frequency component extracted from a motor speed is brought close to zero as much as possible. Adaptive filter function 251 has the following variations. In one of the variations, a vibration component is extracted from the torque command. In another variation, the vibration component is extracted from a difference with a model response. In still another variation, a plurality of adaptive filters is included. In yet another variation, a width, a depth, and a Q value are automatically adjusted in addition to a notch frequency.

Generally adaptive filter function 251 extracts the vibration component caused by the resonance characteristics of motor 3 and load 5 by some kind of method. Adaptive filter function 251 automatically sets a filter parameter of resonance suppressor 25 using an adaptive algorithm for minimizing a difference with a normative input.

For example, as disclosed in PTL 6, oscillation detecting function 26 extracts a fluctuation component from the motor positional information transmitted from encoder 4. Oscillation detecting function 26 detects oscillation states of motor 3 and load 5 by a comparison between the extracted fluctuation component and a threshold, a determination of a duration, and the like.

When oscillation detecting function 26 detects the oscillation, oscillation detecting function 26 transmits oscillation detection information to stiffness setting function 231 mentioned above. Thus, oscillation detecting function 26 selects the stiffness value such that a frequency band width of a feedback loop is narrowed, and automatically suppresses the oscillation.

For example, as disclosed in PTL 7, evaluation indicator measuring function 27 periodically measures and stores input and output data. Evaluation indicator measuring function 27 is function to calculate, display, and accumulate an evaluation value from the input and output data corresponding to the evaluation indicator. As used herein, the input and output data means the position command output of command selector 21, the motor position output of encoder 4, the torque command output of load characteristic compensator 24, and the like. As used herein, the evaluation indicator means a settling time, an overshoot, a torque fluctuation, and the like. One of the important features of the present function is that data is compressed to fewer meaningful evaluation indicators from a huge amount of motor control information that can be obtained in real time.

For example, PTL 8 discloses a method for adjusting a gain parameter value corresponding to the stiffness indicator and a target response characteristic adjustment gain corresponding to the command response indicator.

CITATION LIST

Patent Literatures

PTL 1: Unexamined Japanese Patent Publication No. 5-346359
PTL 2: Unexamined Japanese Patent Publication No. 2007-336792
PTL 3: Unexamined Japanese Patent Publication No. 6-319284
PTL 4: Unexamined Japanese Patent Publication No. 2005-168166
PTL 5: Unexamined Japanese Patent Publication No. 2004-274976
PTL 6: International Patent Publication No. 2008/087893
PTL 7: International Patent Publication No. 2009/096169
PTL 8: Unexamined Japanese Patent Publication No. 2006-254630

SUMMARY OF THE INVENTION

A motor drive device covered by the present invention drives a motor. The motor drive device includes a command response setting unit, a position and speed controller, a load characteristic compensator, a servo adjuster, a command response setting function, a stiffness setting function, an evaluation indicator measuring function, and a storage.

The command response setting unit receives a position command to perform filter processing of removing a specific frequency band. The command response setting unit transmits a result of the filter processing as a post-filter position command.

The position and speed controller receives the post-filter position command and motor positional information transmitted from an encoder. The position and speed controller generates a torque command such that a deviation between the post-filter position command and the motor positional information becomes zero. The position and speed controller transmits the generated torque command.

The load characteristic compensator receives the torque command, and multiplies inertia estimated values of the motor and a load applied to the motor. The load characteristic compensator adds a friction torque estimated value of the load after the multiplication of the inertia estimated value, and generates a post-compensation torque command to drive the motor. The load characteristic compensator transmits the generated post-compensation torque command.

The servo adjuster stores a plurality of command response indicators and a plurality of stiffness indicators therein. The servo adjuster generates an evaluation indicator measuring pattern by a combination of each command response indicator and each stiffness indicator.

The command response setting function automatically sets a filter characteristic of the command response setting unit in accordance with the command response indicator constituting the evaluation indicator measuring pattern, the command response indicator being transmitted from the servo adjuster.

The stiffness setting function automatically sets a parameter of the position and speed controller in accordance with the stiffness indicator constituting the evaluation indicator measuring pattern, the stiffness indicator being transmitted from the servo adjuster.

The evaluation indicator measuring function automatically measures an evaluation indicator derived from at least one of the position command, the motor positional information, and the post-compensation torque command.

The storage stores a result measured by the evaluation indicator measuring function therein.

Particularly the motor drive device drives the motor while sequentially changing the command response indicators and the stiffness indicators in accordance with the generated evaluation indicator measuring pattern.

BRIEF DESCRIPTION OF DRAWINGS

FIG. 6 is a block diagram illustrating a main part of a command response setting function 221 in FIGS. 1A and 1B.

FIG. 7B is an explanatory view illustrating a stiffness table 231a in FIG. 7A.

FIG. 10A is an explanatory view illustrating an example in which a command response indicator range is determined from maximum stiffness in the servo drive device according to the first exemplary embodiment of the present invention.

FIG. 11A is an explanatory view illustrating an example in which the command response indicator range is determined from the maximum stiffness in the servo drive device according to the first exemplary embodiment of the present invention.

FIG. 12A is an explanatory view illustrating an example in which the command response indicator range is determined from the maximum stiffness in the servo drive device according to the first exemplary embodiment of the present invention.

FIG. 13A is an explanatory view illustrating an example in which the command response indicator range is determined from the maximum stiffness in the servo drive device according to the first exemplary embodiment of the present invention.

FIG. 17A is an explanatory view illustrating an example in which the command response indicator range is determined from the maximum stiffness in the servo drive device according to the first exemplary embodiment of the present invention.

DESCRIPTION OF EMBODIMENTS

Figure 1A:
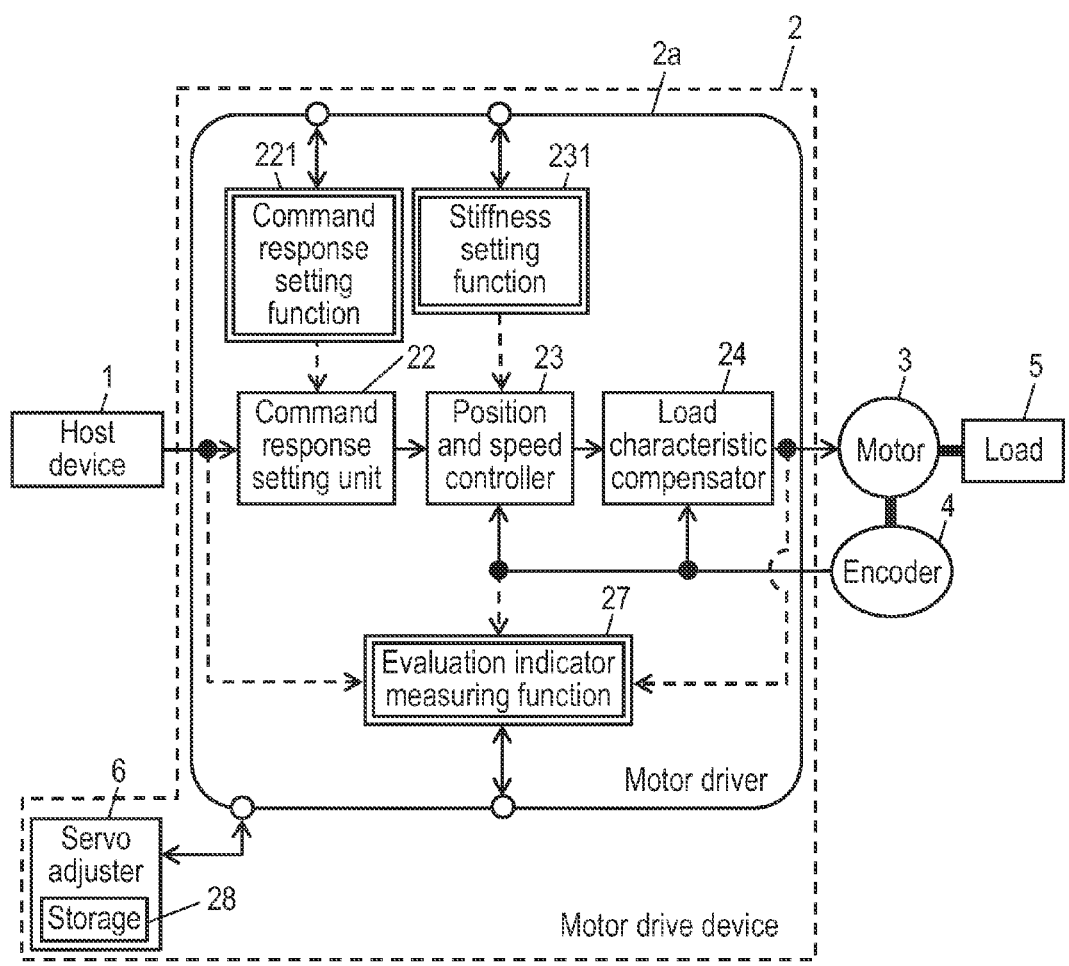
FIG. 1A is a block diagram illustrating a motor drive device according to a first exemplary embodiment of the present invention.

In a motor drive device according to an exemplary embodiment of the present invention, a worker who does not have detailed knowledge or a sufficient experience can easily obtain the result associated with the servo adjustment because of a later-described configuration. The obtained result associated with the servo adjustment has higher stability while satisfying a requirement of evaluation indicator suitable for each use.

A conventional motor drive device has the following points to be improved. That is, in the conventional motor drive device, various automatic adjustment functions are individually optimized. Therefore, in the conventional motor drive device, matching is not established in a series of servo adjustment flows.

For example, in command response setting function 221, a settling time can be shortened with increasing command response indicator in positioning control (also referred to as PTP (Point To Point) control). In command response setting function 221, a tracking error can be reduced with increasing command response indicator in locus control (also referred to as CP (Continuous Path) control). However, in command response setting function 221, there is a restriction because of discretization of the external position command or the setting of command resolution.

In command response setting function 221, depending on the stiffness of the apparatus to which motor 3 and load 5 are fixed, sometimes the command response indicator is lowered in consideration of a machine stand vibration. In such cases, a worker is required for understanding of a host device and an operational experience of a real machine.

In stiffness setting function 231, a disturbance suppressing characteristic is improved with increasing stiffness indicator. Therefore, in stiffness setting function 231, the overshoot amount of the PTP control can be decreased compared with the CP control. In stiffness setting function 231, the tracking error of the CP control can be decreased compared with the PTP control. However, how much the stiffness indicator can be increased highly depends on stability of the feedback control of position and speed controller 23. Therefore, the worker is required for knowledge about a control theory in order to perform optimum adjustment.

It is necessary to set position and speed controller 23, the total inertia of load characteristic compensator 24, and resonance suppressor 25 in correct order. When these setting are performed in incorrect order, the feedback stability is lost and sometimes the responsiveness designated by the stiffness indicator is not obtained. In the worst case, motor 3 is destabilized and oscillated. That is, the worker is required for not only the control theory but also understanding of a servo adjustment procedure.

Evaluation indicator measuring function 27 has no influence on the basic function of controlling the motor. However, depending on the evaluation indicator, sometimes the setting of the command pattern or basic function is restricted to a certain degree in order to obtain a correct measurement result. A positioning settling time in the PTP control can be cited as an example. The positioning settling time is defined as a time interval from a time point the external position command stops to a time point the motor position enters a positioning completion range.

However, due to the low command response indicator or stiffness indicator, sometimes a next change of the external position command is started before the motor position enters the positioning completion range. In such cases, the positioning settling time cannot be measured. That is, unless the worker understands a meaning of the evaluation indicator or a method for measuring the evaluation indicator measuring function, the worker cannot decide the result of the servo adjustment.

Usually, operation of enabling or disabling each of the automatic adjustment functions or a mode setting is individually performed from the outside of the motor drive device. However, it is very difficult for the worker to manipulate all the automatic adjustment functions in the correct order for performing the servo adjustment.

PTL 8 discloses the method for adjusting the gain parameter value corresponding to the stiffness indicator and the target response characteristic adjustment gain corresponding to the command response indicator. However, the desired evaluation indicator of the motor drive device depends on an application. It is difficult to obtain the optimum adjustment result for all the applications.

The setting of the gain parameter value is increased up to a limit at which a mechanical vibration is not generated. Therefore, the adjustment result in which control stability is enhanced while the necessary evaluation indicator is satisfied is not always obtained in the gain parameter value.

Additionally, a tendency of the evaluation indicator cannot be known when the gain parameter value corresponding to the stiffness indicator and the target response characteristic adjustment gain corresponding to the command response indicator are changed. Therefore, the gain parameter value has not an insufficient width in a range where the setting value is selected.

Hereinafter, exemplary embodiments of the present invention will be described with reference to the drawings. The following exemplary embodiments illustrate specific examples of the present invention, but do not restrict the technical range of the present invention.

First Exemplary Embodiment

Figure 1B:
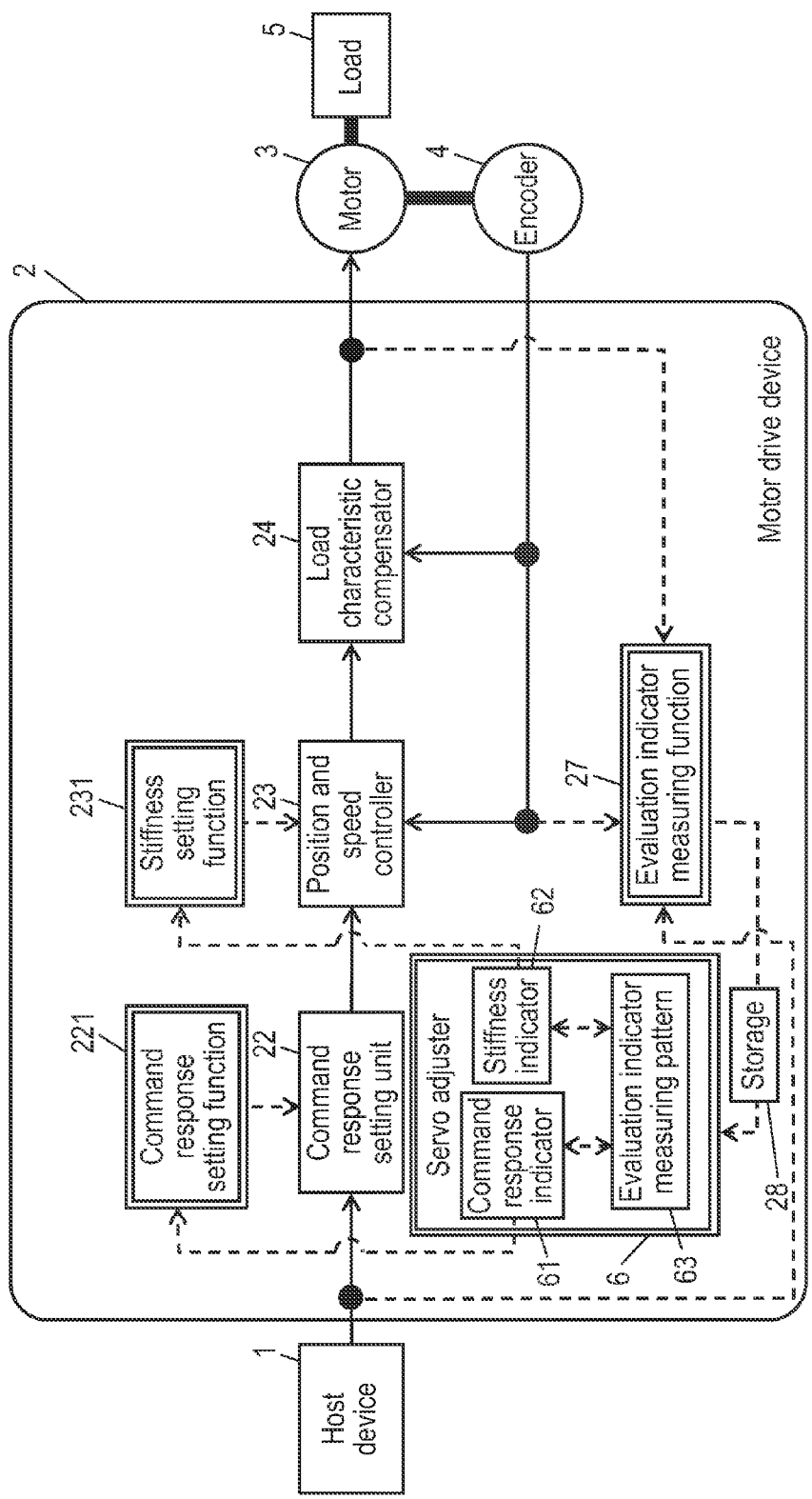
FIG. 1B is a block diagram illustrating another motor drive device according to the first exemplary embodiment of the present invention.

FIG. 1A is a block diagram illustrating a motor drive device according to a first exemplary embodiment of the present invention. FIG. 1B is a block diagram illustrating another motor drive device according to the first exemplary embodiment of the present invention.

Figure 19:
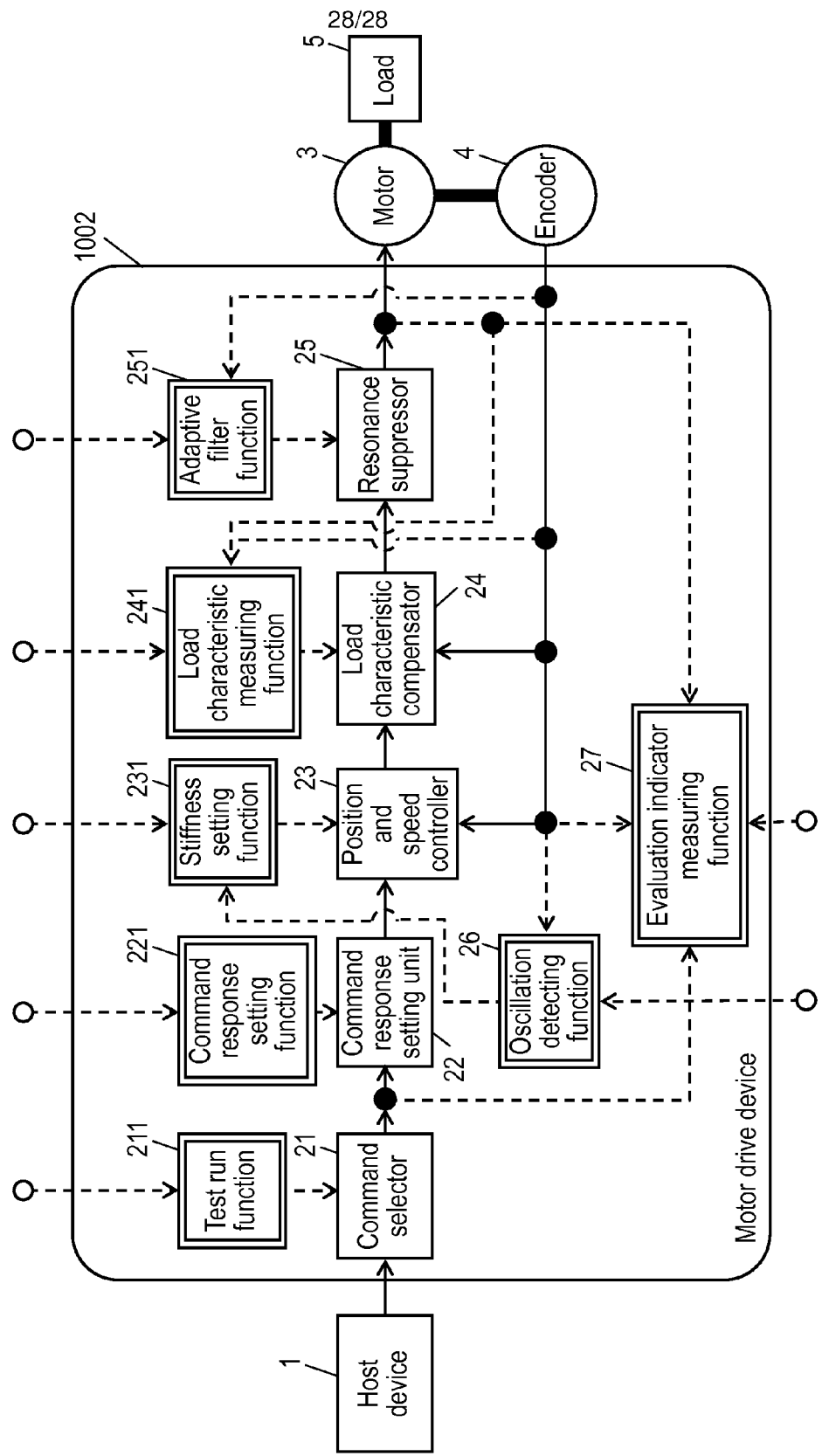
FIG. 19 is a block diagram illustrating a conventional motor drive device.

The component similar to that of conventional motor drive device 1002 in FIG. 19 is designated by the identical reference mark, and the description in FIG. 19 is incorporated herein.

Motor drive device 2 according to the first exemplary embodiment of the present invention drives motor 3. Motor drive device 2 includes command response setting unit 22, position and speed controller 23, load characteristic compensator 24, servo adjuster 6, command response setting function 221, stiffness setting function 231, evaluation indicator measuring function 27, and storage 28.

Command response setting unit 22 receives position command to perform the filter processing of removing a specific frequency band. Command response setting unit 22 transmits a result of the filter processing as the post-filter position command.

Position and speed controller 23 receives the post-filter position command and the motor positional information transmitted from encoder 4. Position and speed controller 23 generates the torque command such that the deviation between the post-filter position command and the motor positional information becomes zero. Position and speed controller 23 transmits the generated torque command.

Load characteristic compensator 24 receives the torque command, and multiplies the inertia estimated values of motor 3 and load 5 applied to motor 3. Load characteristic compensator 24 adds the friction torque estimated value of load 5 after the multiplication of the inertia estimated value, and generates a post-compensation torque command to drive motor 3. Load characteristic compensator 24 transmits the generated post-compensation torque command.

Servo adjuster 6 stores a plurality of command response indicators 61 and a plurality of stiffness indicators 62 therein. Servo adjuster 6 generates evaluation indicator measuring pattern 63 by a combination of each command response indicator 61 and each stiffness indicator 62.

Command response setting function 221 automatically sets a filter characteristic of the command response setting unit in accordance with the command response indicator constituting evaluation indicator measuring pattern 63, the command response indicator being transmitted from servo adjuster 6.

Stiffness setting function 231 automatically sets a parameter of position and speed controller 23 in accordance with stiffness indicator 62 constituting evaluation indicator measuring pattern 63, stiffness indicator 62 being transmitted from servo adjuster 6.

Evaluation indicator measuring function 27 automatically measures an evaluation indicator derived from at least one of the position command, the motor positional information, and the post-compensation torque command.

Storage 28 stores the result measured by evaluation indicator measuring function 27.

Particularly, motor drive device 2 of the first exemplary embodiment of the present invention drives motor 3 while sequentially changing command response indicators 61 and stiffness indicators 62 in accordance with generated evaluation indicator measuring pattern 63.

At least one of a positioning settling time, an overshoot amount, a vibration level, and the number of positioning completion output signal changing times can be used as the evaluation indicator.

In the motor drive device of the first exemplary embodiment of the present invention, even the worker who does not have the detailed knowledge about the servo adjustment can perform the servo adjustment with higher stability while satisfying the evaluation indicator depending on the application.

A hardware configuration will mainly be described in detail below with reference to FIGS. 1A to 8.

Motor drive device 2 in FIG. 1A differs from motor drive device 2 in FIG. 1B in the position where storage 28 is installed. In motor drive device 2 in FIG. 1A, motor driver 2a including the basic function of driving motor 3 and storage 28 are individually formed. In motor drive device 2 in FIG. 1B, a portion including the basic function of driving motor 3 and storage 28 are integrally formed.

As illustrated in FIGS. 1A and 1B, motor drive device 2 of the first exemplary embodiment mainly has the following features. That is, the automatic-adjustment-function-related transmission to and reception from the outside are performed through servo adjuster 6. The automatic-adjustment-function-related controls can be performed by servo adjuster 6.

In the first exemplary embodiment, the following component that is not always necessary is omitted from conventional motor drive device 1002 in FIG. 19. That is, command selector 21, resonance suppressor 25, oscillation detecting function 26, test run function 211, load characteristic measuring function 241, and adaptive filter function 251 are omitted from conventional motor drive device 1002.

As illustrated in FIG. 1A, in the first exemplary embodiment, the basic function of controlling the drive of motor 3 is implemented by connecting host device 1, motor driver 2a, and motor 3. Motor driver 2a includes command response setting unit 22, position and speed controller 23, and load characteristic compensator 24.

As illustrated in FIG. 1A, motor drive device 2 includes the basic function of controlling the drive of motor 3. In FIG. 1A, basic performance is implemented by the following flow in which blocks are connected to each other by a solid line using a block surrounded by a singlet.

Host device 1 transmits the external position command to motor drive device 2. The external position command transmitted from host device 1 is received by the command response setting unit 22 of motor drive device 2.

Command response setting unit 22 may use the internal position command instead of the external position command in the case that motor drive device 2 includes a test run function of generating the internal position command.

Figure 2A:
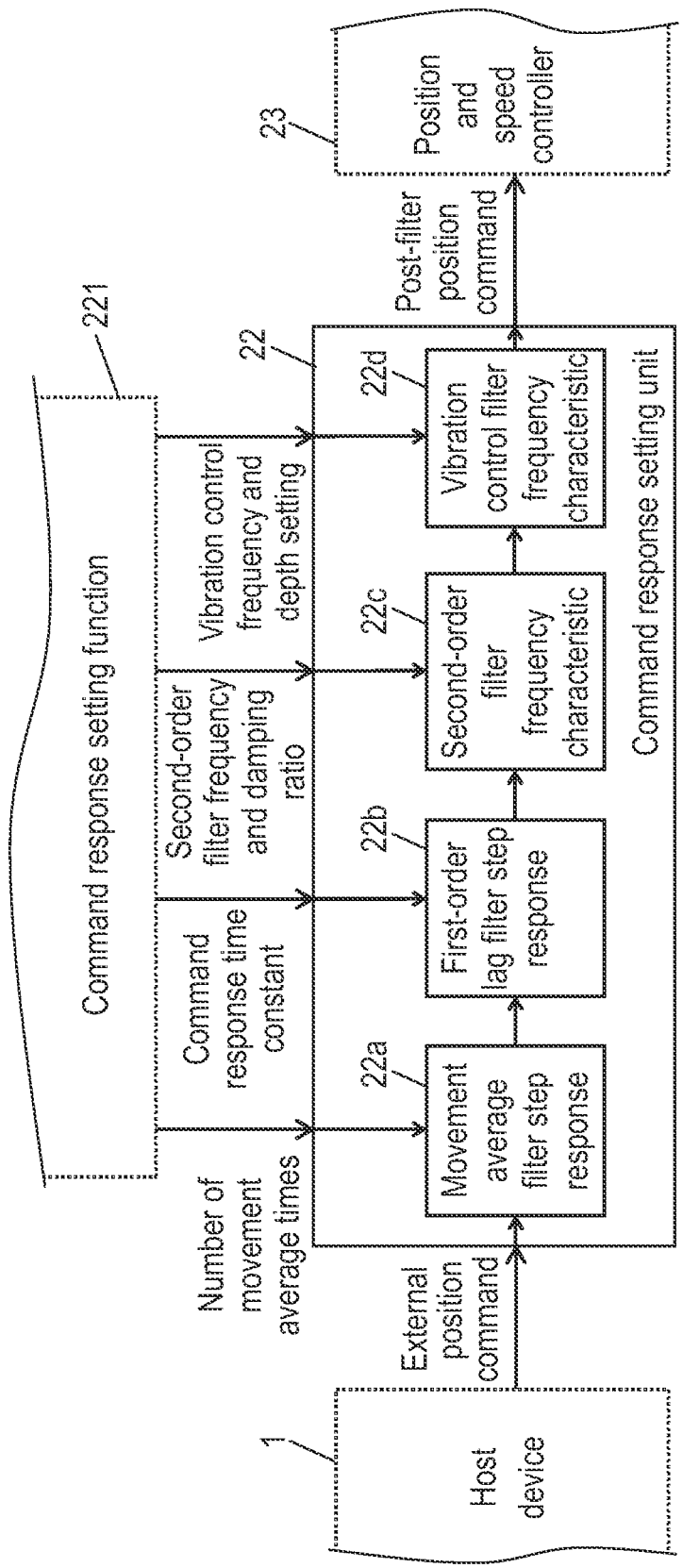
FIG. 2A is a block diagram illustrating a main part of a command response setting unit 22 in FIGS. 1A and 1B.
Figure 2B:
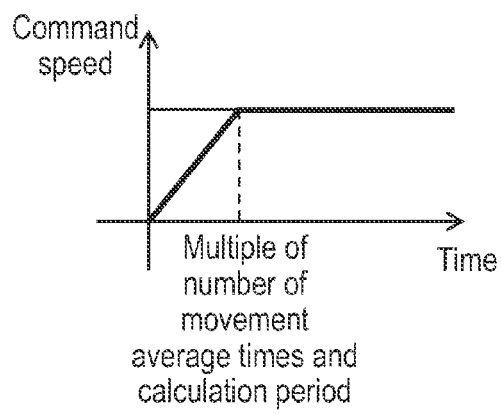
FIG. 2B is a characteristic diagram illustrating a movement average filter step response 22a in FIG. 2A.
Figure 2C:
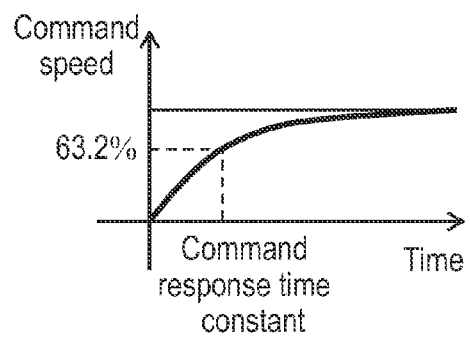
FIG. 2C is a characteristic diagram illustrating a first-order lag filter step response 22b in FIG. 2A.
Figure 2D:
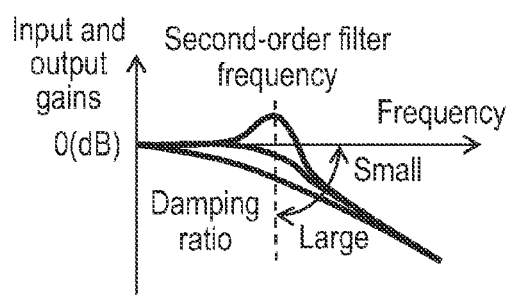
FIG. 2D is a characteristic diagram illustrating a second-order filter frequency characteristic 22c in FIG. 2A.
Figure 2E:
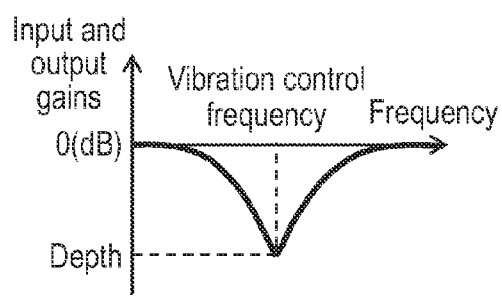
FIG. 2E is a characteristic diagram illustrating a vibration control filter frequency characteristic 22d in FIG. 2A.

FIG. 2A is a block diagram illustrating a main part of command response setting unit 22 in FIGS. 1A and 1B. FIG. 2B is a characteristic diagram illustrating movement average filter step response 22a in FIG. 2A. FIG. 2C is a characteristic diagram illustrating first-order lag filter step response 22b in FIG. 2A. FIG. 2D is a characteristic diagram illustrating second-order filter frequency characteristic 22c in FIG. 2A. FIG. 2E is a characteristic diagram illustrating vibration control filter frequency characteristic 22d in FIG. 2A.

As illustrated in FIG. 2A, command response setting unit 22 receives the external position command transmitted from host device 1, and transmits the post-filter position command after the following process.

That is, as illustrated in FIGS. 2A and 2B, movement average filter step response 22a receives the external position command and the number of movement average times transmitted from command response setting function 221 (to be described later). Movement average filter step response 22a performs movement average processing on the number of movement average times assigned by command response setting function 221.

As illustrated in FIGS. 2A and 2C, first-order lag filter step response 22b receives a result of the movement average processing performed by movement average filter step response 22a and a command response time constant transmitted from command response setting function 221. First-order lag filter step response 22b adds a step response characteristic to the command response time constant.

As illustrated in FIGS. 2A and 2D, second-order filter frequency characteristic 22c receives a result obtained from first-order lag filter step response 22b, a second-order filter frequency, and a damping ratio, the second-order filter frequency and the damping ratio being transmitted from command response setting function 221. Second-order filter frequency characteristic 22c transmits a result which is specified by the second-order filter frequency and the damping ratio.

As illustrated in FIGS. 2A and 2E, vibration control filter frequency characteristic 22d receives the result obtained from second-order filter frequency characteristic 22c, a vibration control frequency, and a depth, the vibration control frequency and the depth being transmitted from command response setting function 221. Vibration control filter frequency characteristic 22d obtains the post-filter position command through a vibration control filter which is defined by the vibration control frequency and the depth. Command response setting unit 22 transmits the post-filter position command obtained by vibration control filter frequency characteristic 22d to the next process.

Figure 3:
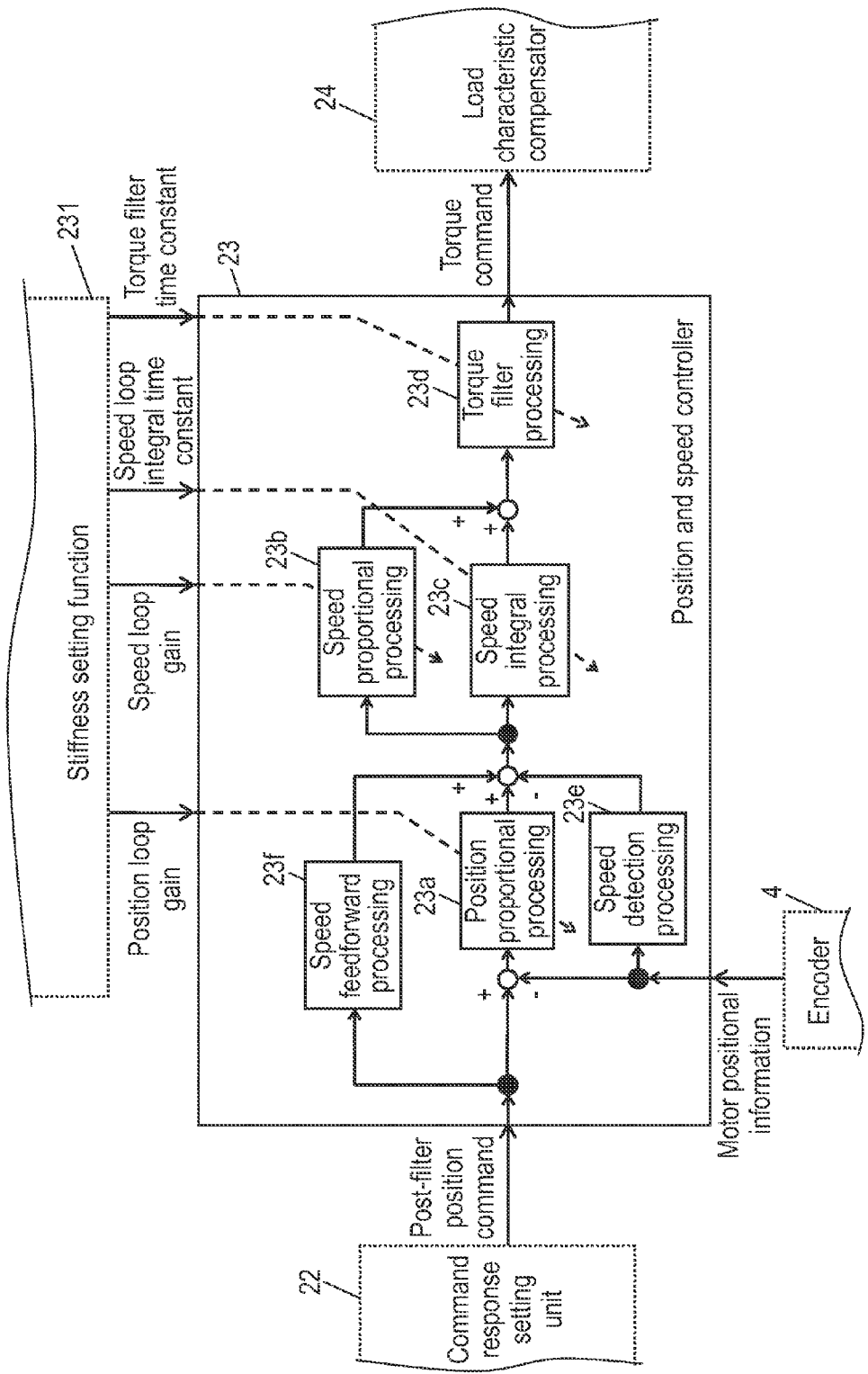
FIG. 3 is a block diagram illustrating a main part of a position and speed controller 23 in FIGS. 1A and 1B.

FIG. 3 is a block diagram illustrating a main part of position and speed controller 23 in FIGS. 1A and 1B.

As illustrated in FIG. 3, position and speed controller 23 receives, together with the post-filter position command, motor positional information from encoder 4 connected to motor 3 which is to be driven. Position and speed controller 23 transmits the torque command such that the deviation between the post-filter position command and the motor positional information becomes zero.

Specifically, a positional deviation that is of a difference between the post-filter position command and the motor positional information is calculated. Stiffness setting function 231 (to be described later) transmits a position loop gain to position and speed controller 23.

Position and speed controller 23 performs position proportional processing 23a of multiplying the positional deviation by the position loop gain designated by stiffness setting function 231. Position and speed controller 23 obtains a speed command as a result of position proportional processing 23a.

Position and speed controller 23 perform speed detection processing 23e that is feasible from a difference between the pieces of motor positional information. Position and speed controller 23 obtains a motor speed as a result of the speed detection processing 23e.

Position and speed controller 23 calculates a speed deviation that is of a difference between the speed command and the motor speed.

Stiffness setting function 231 transmits the speed loop gain and a speed loop integral time constant to position and speed controller 23.

The position and speed controller 23 performs speed proportional processing 23b using the calculated speed deviation and the speed loop gain designated by the stiffness setting function 231. Position and speed controller 23 also performs speed integral processing 23c using the calculated speed deviation and the speed loop integral time constant. Position and speed controller 23 obtains the internal torque command as a result of the addition of the values transmitted from speed proportional processing 23b and speed integral processing 23c.

Stiffness setting function 231 transmits a torque filter time constant to position and speed controller 23.

Position and speed controller 23 performs torque filter processing 23d on the internal torque command and a first-order lag filter using the torque filter time constant designated by stiffness setting function 231. Position and speed controller 23 obtains the torque command as a result of torque filter processing 23d. Position and speed controller 23 transmits the obtained torque command to a subsequent process.

A result of speed feedforward processing 23f that is feasible from a difference between the post-filter position commands may be added to the speed command in order to improve the responsiveness.

Figure 4:
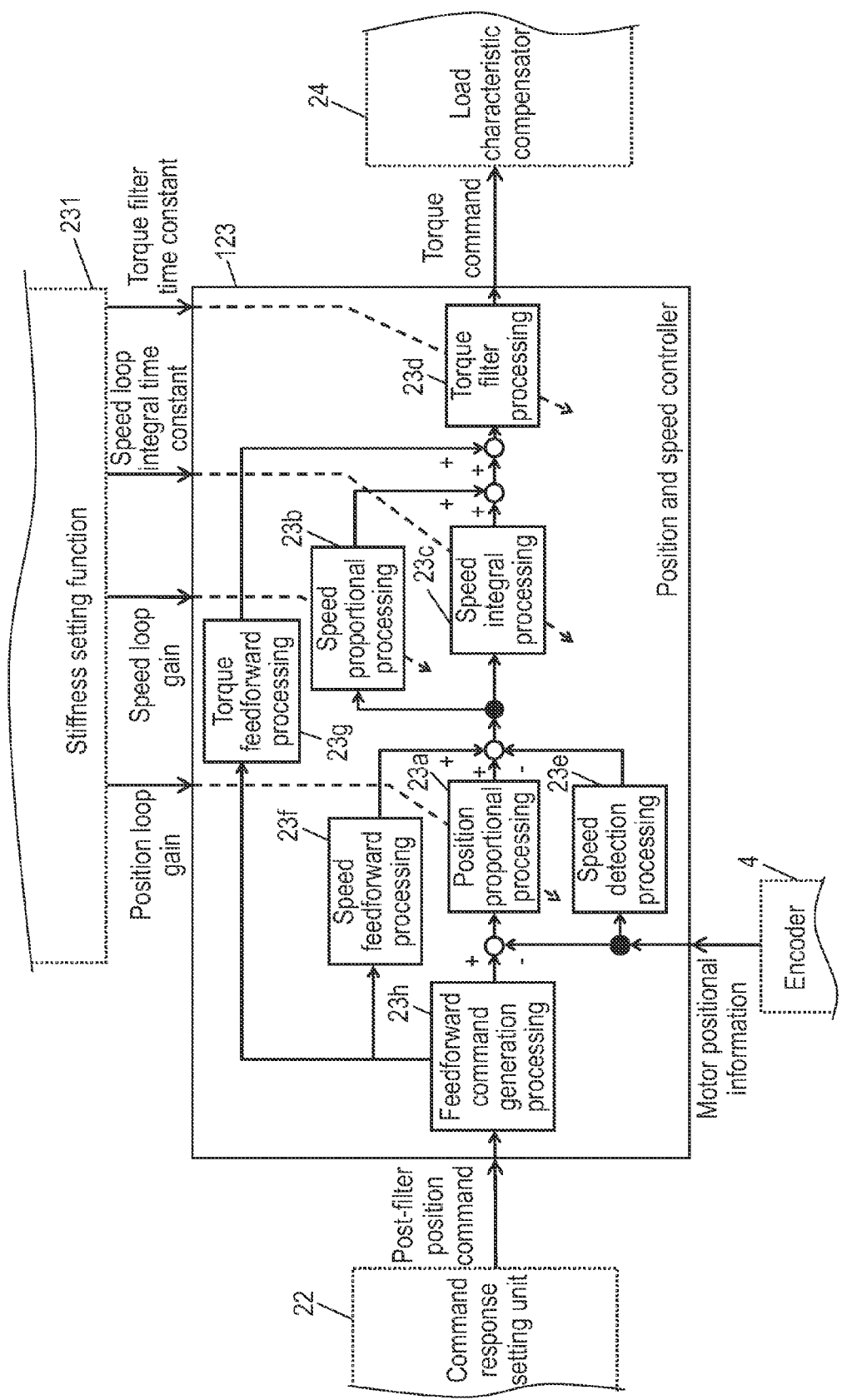
FIG. 4 is a block diagram illustrating a main part of another exemplary embodiment of the position and speed controller 23 in FIGS. 1A and 1B.

FIG. 4 is a block diagram illustrating a main part of another exemplary embodiment of position and speed controller 23 in FIGS. 1A and 1B.

Position and speed controller 123 in FIG. 4 that is of another specific example will be described below. In position and speed controller 123, a first-order difference or a second-order difference of the post-filter position command is combined with the filter processing, and feedforward command generation processing is performed. Then three feasible commands as follows are simultaneously generated.

That is, the first generated command is a feedforward position command received by position proportional processing 23a. The second generated command is a feedforward speed command received by speed feedforward processing 23f. The third generated command is a feedforward torque command received by torque feedforward processing 23g.

Position and speed controller 123 receives the motor positional information that is transmitted from encoder 4 connected to motor 3 which is to be driven. Position and speed controller 123 calculates the positional deviation that is of a difference with the feedforward position command. The stiffness setting function 231 (to be described later)

transmits the position loop gain to position and speed controller 123. Position and speed controller 123 performs position proportional processing 23a of multiplying the calculated positional deviation by the position loop gain designated by stiffness setting function 231. Position and speed controller 123 obtains the speed command as a result of position proportional processing 23a.

In the configuration of position and speed controller 123, the speed command is added to the value that is transmitted from speed feedforward processing 23f receiving the feedforward speed command. The position and speed controller 123 obtains the motor speed through the speed detection processing 23e that is feasible from the difference between the pieces of motor positional information. Position and speed controller 123 calculates the speed deviation that is of the difference between the speed command and the motor speed.

Stiffness setting function 231 transmits the speed loop gain and the speed loop integral time constant to position and speed controller 123.

Position and speed controller 123 performs speed proportional processing 23b using the calculated speed deviation and the speed loop gain designated by stiffness setting function 231. Position and speed controller 123 also performs speed integral processing 23c using the calculated speed deviation and the speed loop integral time constant. Position and speed controller 123 obtains the internal torque command as a result of the addition of the values transmitted from speed proportional processing 23b and speed integral processing 23c.

In the configuration of position and speed controller 123, the internal torque command is added to the value that is transmitted from torque feedforward processing 23g receiving the feedforward torque command.

Stiffness setting function 231 transmits the torque filter time constant to position and speed controller 123.

Position and speed controller 123 performs torque filter processing 23d on the value, which is transmitted by torque feedforward processing 23g of adding the internal torque command, using the first-order lag having the torque filter time constant designated by stiffness setting function 231. Position and speed controller 123 obtains the torque command as a result of torque filter processing 23d. Position and speed controller 123 transmits the obtained torque command to the subsequent process.

When the post-filter position command is sufficiently smooth in the configuration, position and speed controller 123 can completely follow the motor position with respect to the post-filter position command in an ideal state in which an influence of a disturbance torque is not taken into account.

Motor drive device 2 can obtain two control elements that can independently be set. In one of the control elements, the command response indicator of command response setting function 221 (to be described later) can freely control a command response. In the other control element, the stiffness indicator of stiffness setting function 231 (to be described later) can freely control a disturbance response.

Figure 5:
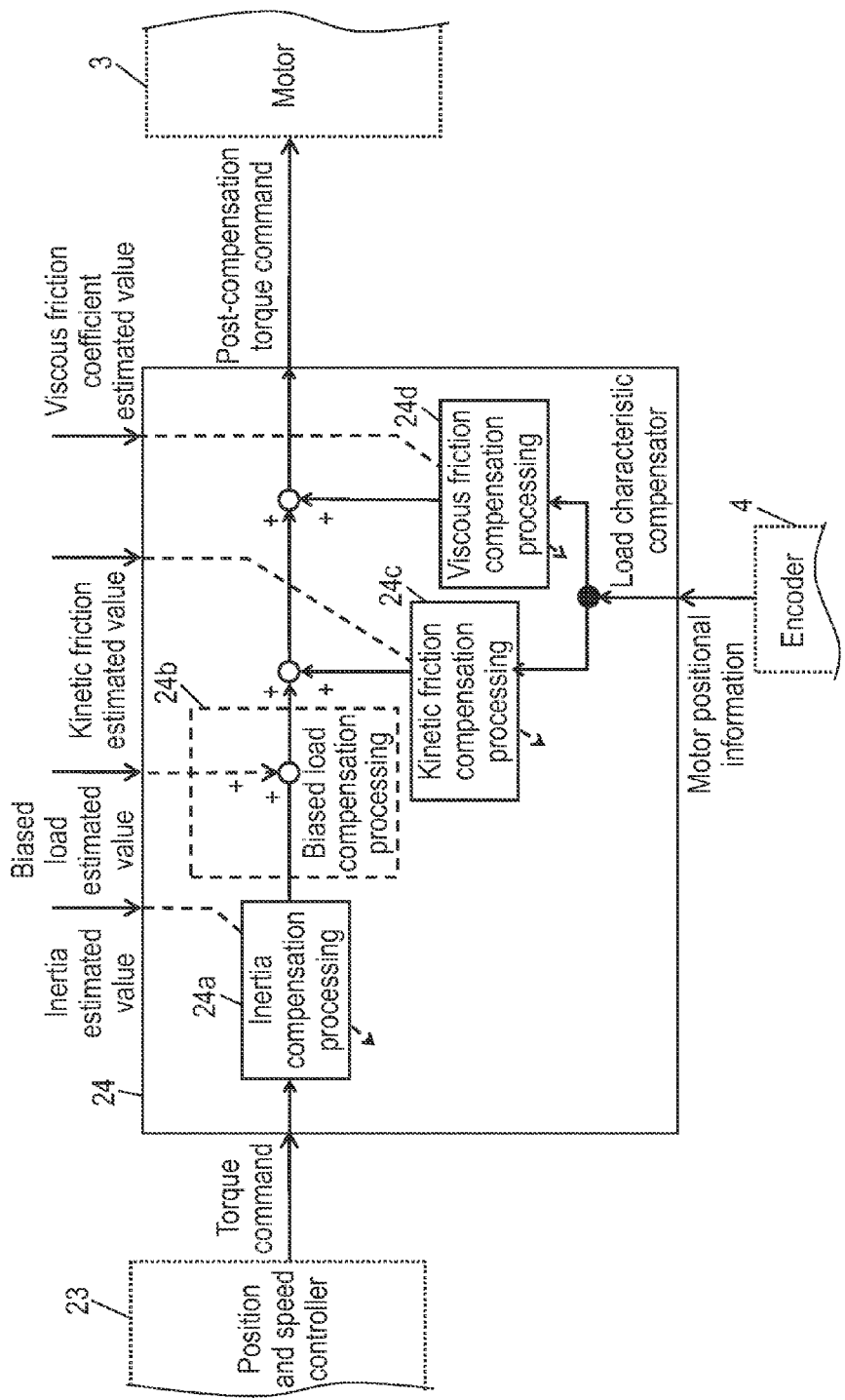
FIG. 5 is a block diagram illustrating a main part of a load characteristic compensator 24 in FIGS. 1A and 1B.

FIG. 5 is a block diagram illustrating a main part of load characteristic compensator 24 in FIGS. 1A and 1B.

As illustrated in FIG. 5, load characteristic compensator 24 performs inertia compensation processing 24a on the torque command. In inertia compensation processing 24a, the torque command is multiplied by an inertia estimated value designated by a previously-set load characteristic. When scaling processing is performed in accordance with the total inertia of motor 3 and load 5, load characteristic compensator 24 can absorb the difference of the inertia, which is equivalent to the motor and depends on load 5.

Like a specific example (to be described later), in load characteristic compensator 24, improvement of readiness or reduction of the response difference caused by the operation direction or speed can be achieved by performing friction compensation in a supposable range. That is, biased load compensation processing 24b of adding a biased load estimated value designated by the load characteristic to the torque command is provided as first friction compensation. Kinetic friction compensation processing 24c is provided as second friction compensation. In kinetic friction compensation processing 24c, the motor speed is calculated from the motor positional information transmitted from encoder 4. In kinetic friction compensation processing 24c, kinetic friction estimated value is added to or subtracted from torque command in accordance with a motor speed direction. Viscous friction compensation processing 24d is provided as third friction compensation. In viscous friction compensation processing 24d, a viscous friction coefficient estimated value is multiplied by the motor speed, and a product is added to the torque command.

The load characteristic compensator 24 transmits the post-compensation torque command as a result of various kinds of load characteristic compensation, as described above.

The motor speed information used in the kinetic friction compensation and viscous friction compensation follows the speed command as long as position and speed controller 23 is activated. Therefore, load characteristic compensator 24 is not influenced by a load variation when the speed command calculated from the difference between the position commands is used instead of the motor speed information. As a result, load characteristic compensator 24 can obtain a stable compensation value.

A voltage or a current is supplied to motor 3 through current control or power circuit. The voltage or current supplied to motor 3 is adjusted in accordance with the post-compensation torque command transmitted from load characteristic compensator 24. Therefore, an output torque of motor 3 changes depending on the post-compensation torque command. As a result, load 5 connected to motor 3 is activated.

Sometimes a vibration is generated by resonance characteristics of motor 3 and load 5 connected to motor 3. When the resonance suppressor is attached to motor drive device 2, the resonance suppressor removes a specific frequency component from the post-compensation torque command transmitted from load characteristic compensator 24. That is, the resonance suppressor performs the filter processing to prevent excitation of the vibration causing the resonance.

As illustrated in FIG. 1A, motor drive device 2 includes the automatic adjustment function. In FIG. 1A, the automatic adjustment function is implemented by the following flow in which blocks are connected to each other by a broken line using a block surrounded by a doublet.

FIG. 6 is a block diagram illustrating a main part of command response setting function 221 in FIGS. 1A and 1B.

As illustrated in FIG. 6, command response setting function 221 receives the following signal from servo adjuster 6 as the command response indicator. The command response indicator includes a movement average time, a time constant, a vibration control frequency, and a depth. The command response indicator also includes a signal indicating an opportunity to reflect the command response indicator received by command response setting function 221 in command response setting unit 22. The signal indicating the opportunity to reflect the command response indicator received by command response setting function 221 in command response setting unit 22 is referred to as a command response indicator reflection starting signal.

In the case that the command response indicator reflection starting signal is on, movement average time setting processing 221a transmits the number of movement average times to command response setting unit 22. The number of movement average times is calculated when the movement average time is divided by a calculation period of movement average filter step response 22a included in command response setting unit 22.

For example, second-order filter setting processing 221c fixes the damping ratio of the second-order filter to 1. For example, in second-order filter setting processing 221c, the frequency of the second-order filter is set to a value in which an inverse number of the time constant included in the command response indicator is divided by $2\pi$.

Vibration control filter setting processing 221d directly transmits a setting associated with the vibration control frequency and the depth to vibration control filter 22d, the setting associated with the vibration control frequency and the depth being included in the command response indicator.

Command response setting unit 22 includes first-order lag filter step response 22b having a step response characteristic of the command response time constant. The command response time constant of first-order lag filter step response 22b is not necessarily calculated in command response setting function 221. The command response time constant of first-order lag filter step response 22b may be set from a first-order lag smoothing time constant that is of a manual setting parameter.

The command response indicator is set in various shapes and combinations. For example, the command response indicator is simply set as a single value such as a command response cutoff frequency. The command response indicator is also set in a form issuing the instruction of a whole of the frequency characteristic such as the first-order lag filter time constant, the second-order lag filter time constant, or the damping ratio. Alternatively, the command response indicator is set in the form of the instruction of a transient characteristic such as a rise time, a delay time, an overshoot amount, and the like. In command response setting unit 22, the filter characteristic may automatically be set such that a whole transmission and reception relationship of command response setting unit 22 is matched with the command response indicator as much as possible.

Figure 7A:
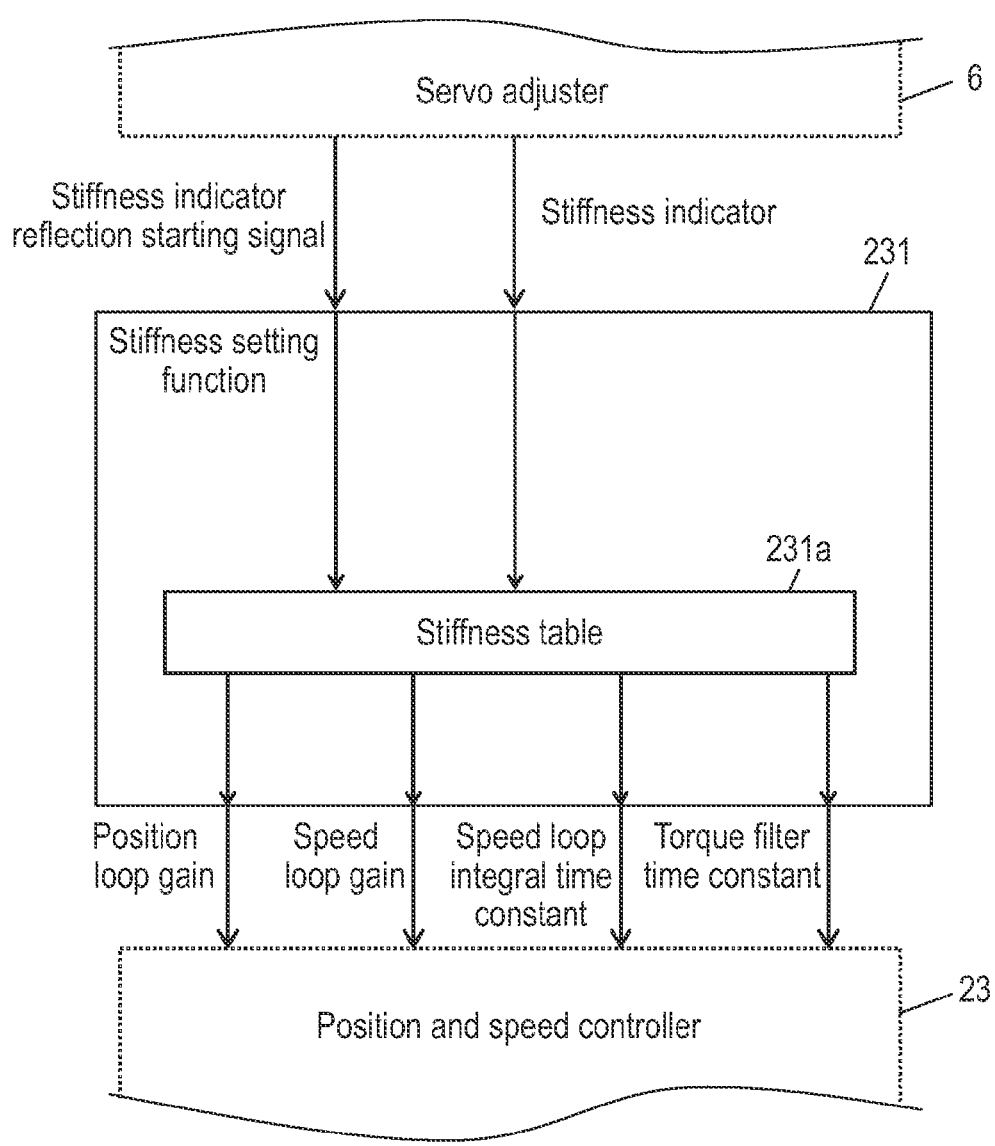
FIG. 7A is a block diagram illustrating a main part of a stiffness setting function 231 in FIGS. 1A and 1B.

FIG. 7A is a block diagram illustrating a main part of the stiffness setting function 231 in FIGS. 1A and 1B. FIG. 7B is an explanatory view illustrating a stiffness table 231a in FIG. 7A.

As illustrated in FIG. 7, the stiffness setting function 231 receives the stiffness indicator from the servo adjuster 6.

In the case that the stiffness indicator reflection starting signal transmitted from servo adjuster 6 is on, stiffness table 231a refers to a table stored in stiffness table 231a, and transmits a parameter set to position and speed controller 23. In the first exemplary embodiment, the stiffness indicator includes 32-step values from 0 to 31. The stiffness indicator transmits such the parameter set that a characteristic suppressing the disturbance of position and speed controller 23 is enhanced with increasing value of the stiffness indicator. The parameter set includes position loop gain Kp, speed loop gain Kvp, speed loop integral time constant Ti, and torque filter time constant TF.

In the stiffness indicator, the parameter set of the position and speed controller 23 may automatically be set such that the transmission and reception relationship of position and speed controller 23 is matched with the stiffness indicator as much as possible by inputting the stiffness indicator associated with the characteristic generally suppressing the disturbance. Generally, the stiffness indicator associated with the characteristic suppressing the disturbance includes an indicator associated with a whole frequency response from the disturbance torque to the motor speed and an indicator associated with a steady characteristic such as a speed variation rate and a jitter.

In the process in which the stiffness setting function 231 transmits the parameter set to the position and speed controller 23 since the stiffness setting function 231 receives the stiffness indicator, sometimes a stiffness table in which the internal parameter is uniquely determined from the stiffness indicator is used as illustrated in this time. Additionally, various automatically setting methods can be used in the process. In the process, only a relationship between one internal parameter and the stiffness indicator is defined, and others are calculated from a proportion between the internal parameters. In the process, the internal parameter is determined from a calculating formula including a plurality of parameters with not only the stiffness indicator but the setting of load characteristic compensator 24 as the input.

Figure 8:
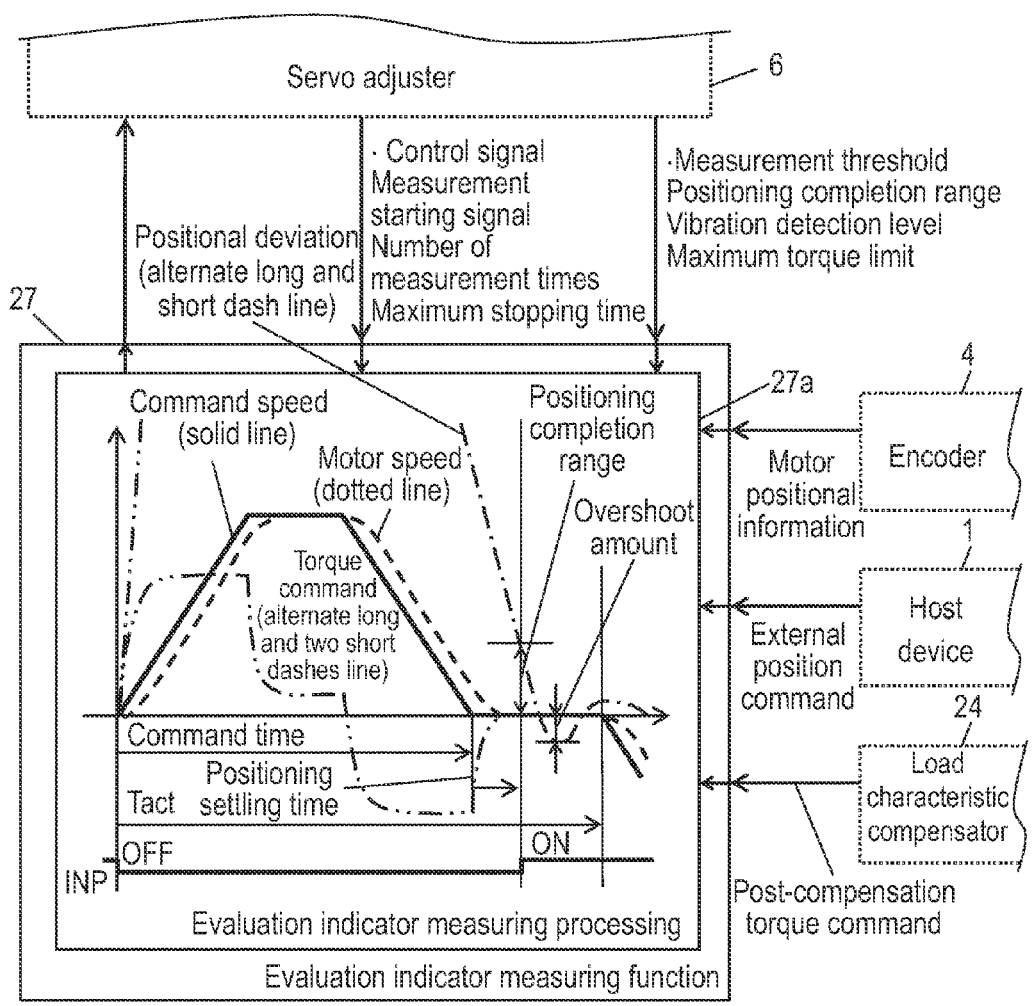
FIG. 8 is a block diagram illustrating a main part of an evaluation indicator measuring function 27 in FIGS. 1A and 1B.

FIG. 8 is a block diagram illustrating a main part of evaluation indicator measuring function 27 in FIGS. 1A and 1B.

As illustrated in FIG. 8, evaluation indicator measuring function 27 receives the motor positional information from encoder 4, receives the external position command from host device 1, and receives the post-compensation torque command from load characteristic compensator 24. Evaluation indicator measuring function 27 receives measurement thresholds of a positioning completion range, a maximum torque limit, a vibration detection level, and the like from servo adjuster 6. Evaluation indicator measuring function 27 transmits various evaluation indicators to servo adjuster 6 in response to a control signal transmitted from servo adjuster 6. Examples of the control signal include a measurement starting signal, the number of measurement times, and a maximum stopping time.

There are various evaluation indicators themselves or methods for calculating the evaluation indicator. As an example, a method for calculating the evaluation indicator of the exemplary embodiment will be described below with reference to FIG. 8.

As illustrated in FIG. 8, the positioning settling time can be measured from a time until the positional deviation falls within the positioning completion range transmitted from servo adjuster 6 after the external position command transmitted from host device 1 stops. As used herein, the positional deviation means a deviation between the external position command and the motor positional information transmitted from encoder 4.

The overshoot amount can be defined as a positional deviation having an opposite direction to a direction of the external position command in the maximum positional deviation and the minimum positional deviation between tacts.

There are some methods for calculating the vibration level and the vibration frequency. For the vibration level and the vibration frequency, there is a method for extracting a vibration component based on the motor positional information transmitted from encoder 4. For the vibration level and the vibration frequency, there is a method for extracting the vibration component of a specific frequency band from the post-compensation torque command transmitted from load characteristic compensator 24. The vibration can be detected by a comparison between a vibration detection level transmitted from servo adjuster 6 and the vibration level and vibration frequency.

A positioning completion output signal is generally used as a signal, which is on when the positional deviation falls within the positioning completion range and is off when the positional deviation is out of the positioning completion range. Hereinafter, the positioning completion output signal is also referred to as an INP. In the INP, the number of INP signal changing times between the tacts is also used as a positioning settling indicator. The number of INP signal changing times may be restricted after the external position command stops.

The command speed or the motor speed is calculated from the difference between the external position commands transmitted from host device 1 or the differences of motor positional information transmitted from encoder 4.

The torque command can be obtained from the post-compensation torque command transmitted from the load characteristic compensator 24.

The positional deviation is the deviation between the external position command and the motor positional information transmitted from encoder 4.

In these values, the value that becomes the maximum or minimum between the tacts is used as the evaluation indicator. The use of the evaluation indicator can understand a large part of the operations generated between the tacts.

An effective value of the torque command is obtained from a square integration root between the tacts. The obtained torque command becomes a useful evaluation indicator in selecting a capacity of motor 3 or motor drive device 2.

As described above, there is a huge amount of motor control information that can be acquired in real time. It is necessary for evaluation indicator measuring function 27 to compress the huge amount of motor control information as fewer meaningful evaluation indicators by a constant algorithm.

Figure 9A:
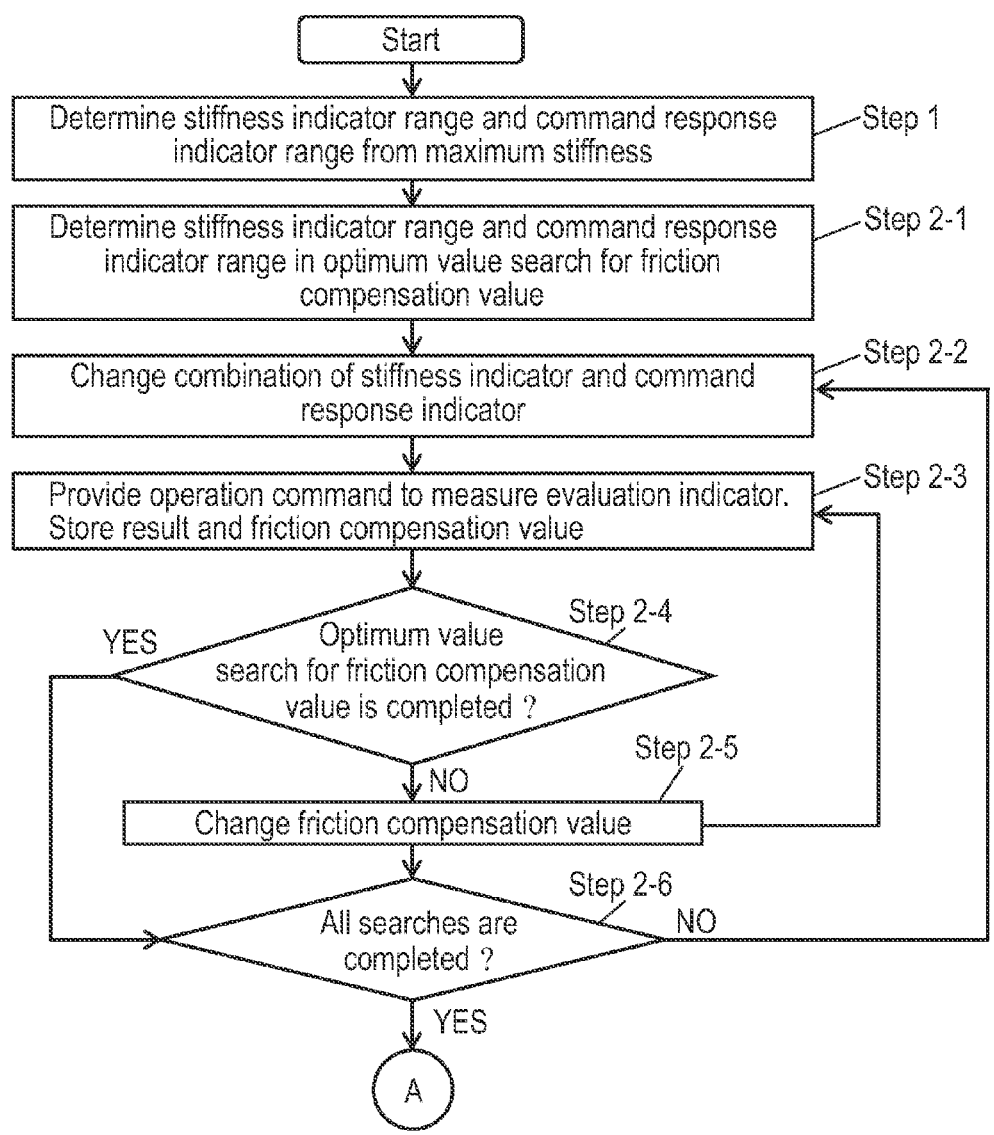
FIG. 9A is a flowchart illustrating servo adjustment of a servo drive device according to the first exemplary embodiment of the present invention.
Figure 9B:
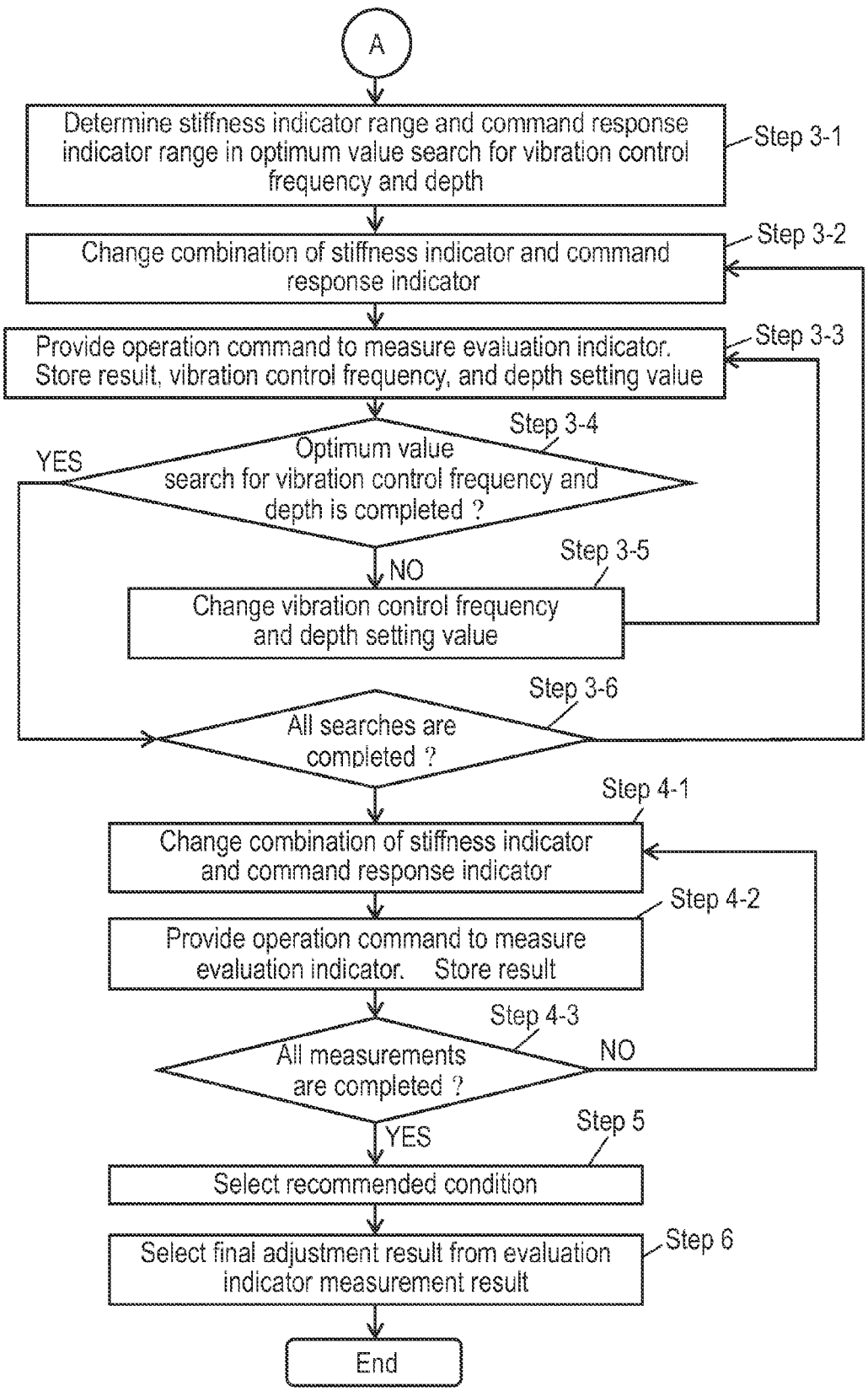
FIG. 9B is a flowchart illustrating the servo adjustment of the servo drive device according to the first exemplary embodiment of the present invention together with FIG. 9A.

FIGS. 9A and 9B are flowcharts illustrating the servo adjustment of the servo drive device according to the first exemplary embodiment of the present invention.

FIGS. 9A and 9B illustrate steps during the servo adjustment with respect to the basic function and automatic adjustment function included in motor drive device 2 of FIGS. 1A and 1B. In the motor drive device 2 of the first exemplary embodiment, a servo adjustment step (to be described later) is performed in servo adjuster 6 of FIGS. 1A and 1B.

Motor drive device 2 of the first exemplary embodiment of the present invention performs the following operation, before driving motor 3 while sequentially changing command response indicators 61 and stiffness indicators 62 in accordance with generated evaluation indicator measuring pattern 63.

In evaluation indicator measuring pattern 63, a first friction compensation measuring pattern is determined by a combination of command response indicator 61 minimizing the time constant and stiffness indicator 62 corresponding to command response indicator 61 minimizing the time constant.

Using command response setting function 221 and stiffness setting function 231, motor 3 is driven while stiffness indicator 62 is sequentially changed. In the first friction compensation measuring pattern, the positioning indicator is measured and the measurement result is stored with respect to all the combinations.

In each first friction compensation measuring pattern, the friction compensation value in which the positioning indicator becomes the best is searched, and the search result is stored.

Alternatively, motor drive device 2 of the first exemplary embodiment of the present invention performs the following operation, before driving motor 3 while sequentially changing command response indicators 61 and stiffness indicators 62 in accordance with generated evaluation indicator measuring pattern 63.

In evaluation indicator measuring pattern 63, a second friction compensation measuring pattern is determined by a combination of stiffness indicator 62 with the lowest responsiveness, and command response indicator 61 corresponding to stiffness indicator 62 with the lowest responsiveness.

Using command response setting function 221 and stiffness setting function 231, motor 3 is driven while command response indicator 61 is sequentially changed. In the second friction compensation measuring pattern, the positioning indicator is measured and the measurement result is stored with respect to all the combinations.

In each second friction compensation measuring pattern, the friction compensation value in which the positioning indicator becomes the best is searched, and the search result is stored.

Alternatively, motor drive device 2 of the first exemplary embodiment of the present invention performs the following operation, before driving motor 3 while sequentially changing command response indicators 61 and stiffness indicators 62 in accordance with generated evaluation indicator measuring pattern 63.

In evaluation indicator measuring pattern 63, a third friction compensation measuring pattern is determined by a combination of command response indicator 61 with the minimum time constant, and stiffness indicator 62 with the lowest responsiveness.

Motor 3 is driven using command response setting function 221 and stiffness setting function 231. In the third friction compensation measuring pattern, the positioning indicator is measured and the measurement result is stored.

In the third friction compensation measuring pattern, the friction compensation value in which the positioning indicator becomes the best is searched, and the search result is stored.

At least one of the positioning settling time, the overshoot amount, and the number of positioning completion output signal changing times can be used as the positioning indicator.

The friction compensation value is searched by increasing or decreasing the friction compensation value such that the positioning indicator becomes the best. The friction compensation value is searched by repeating the increase or the decrease of the friction compensation value in a direction in which the positioning indicator becomes better.

A specific example of the direction in which the positioning indicator becomes better will be described below. The direction in which the positioning indicator becomes better is not limited to the following content.

The positioning indicator becomes better with shortening positioning settling time. The positioning indicator becomes better with decreasing overshoot amount. Desirably, the number of positioning completion output signal changing times is changed only once after the external position command becomes zero. The positioning indicator becomes better with decreasing vibration level.

In the motor drive device according to the first exemplary embodiment of the present invention, the overshoot is not generated in all the patterns within the measurement range. In the motor drive device according to the first exemplary embodiment of the present invention, the measurement result in which the overshoot falls within the positioning completion range can be obtained. Therefore, an option for a final adjustment result by the worker can be expanded.

A software configuration will mainly be described in detail below with reference to FIGS. 9A to 16.

As illustrated in FIG. 9A, in Step 1, a stiffness indicator range and a command response indicator range where the command response is measured are determined from the previously-determined maximum stiffness.

The maximum stiffness is determined as follows. A predetermined initial command response indicator is set to command response setting unit 22. A predetermined initial stiffness indicator is set to stiffness setting function 231. In the initial command response indicator and the initial stiffness indicator, desirably the responsiveness is set to a lower level such that motor 3 and load 5 are not oscillated.

An operation pattern of the external position command transmitted from host device 1 is determined. The load characteristic is measured based on the operation pattern. Desirably, in order to properly measure the load characteristic, the operation pattern is set such that the acceleration, the maximum speed, or the torque command is increased. Each estimated value of the inertia, biased load, kinetic friction, and viscous friction coefficient is measured as the load characteristic. Measured estimated values are set to inertia compensation processing 24a of load characteristic compensator 24, biased load compensation processing 24b, kinetic friction compensation processing 24c, and viscous friction compensation processing 24d.

Then, the load characteristic is measured while the stiffness indicator is increased with respect to the determined operation pattern. The low stiffness indicator, in which a given margin is ensured from the stiffness indicator in which the oscillations of motor 3 and load 5 are generated, is used as the maximum stiffness. In the case that a limiting value is provided in vibration levels of motor 3 and load 5, the stiffness indicator immediately before the vibration level exceeds the limiting value is used as the maximum stiffness.

Sometimes the filter processing of removing a specific frequency component from the post-compensation torque command is performed such that the vibration caused by the resonance characteristics of motor 3 and load 5 connected to motor 3 is not excited. In the case that the resonance suppressor on which the filter processing is performed exists, the load characteristic is measured while the filter processing is performed. That is, the stiffness indicator is increased while the filter processing is performed. In the measurement of the load characteristic, desirably the setting value of the resonance suppressor is stored in each stiffness indicator.

Figure 10B:
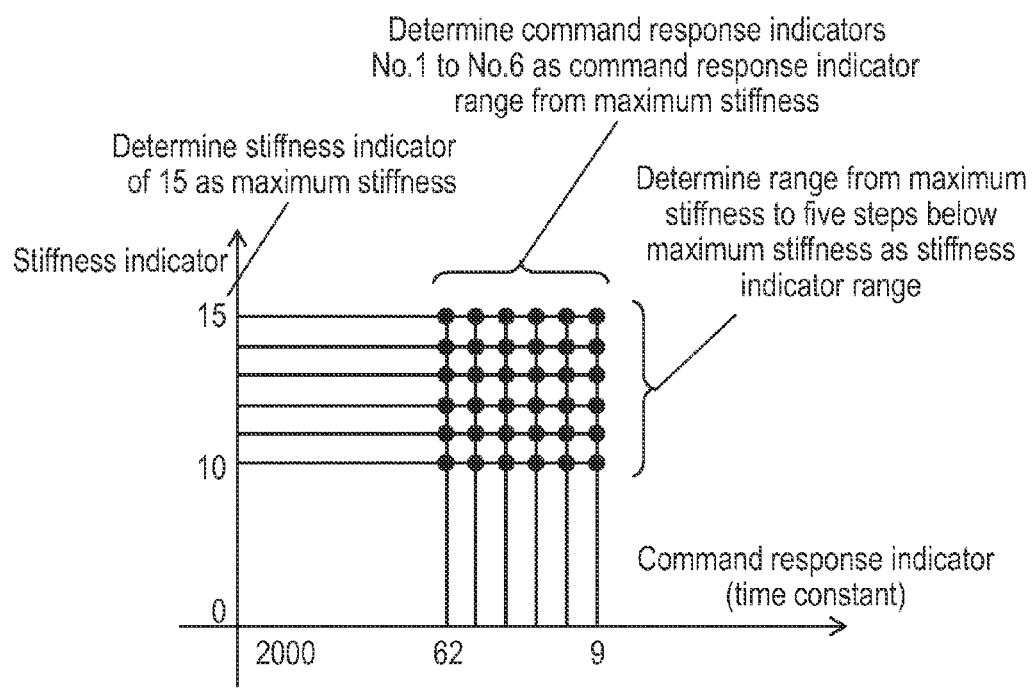
FIG. 10B is an explanatory view illustrating an example in which the stiffness indicator range including maximum stiffness is determined in the servo drive device according to the first exemplary embodiment of the present invention.

FIG. 10A is an explanatory view illustrating an example in which the command response indicator range is determined from the maximum stiffness in the servo drive device according to the first exemplary embodiment of the present invention. FIG. 10B is an explanatory view illustrating an example in which the stiffness indicator range including maximum stiffness is determined in the servo drive device according to the first exemplary embodiment of the present invention.

As illustrated in FIGS. 10A and 10B, the stiffness indicator range and the command response indicator range are determined from the maximum stiffness. As illustrated in FIG. 10A, in the command response indicator range, 6 patterns from command response indicator NO. 1 to command response indicator NO. 6 are selected from the maximum stiffness. As illustrated in FIG. 10B, in the stiffness indicator range, 6 patterns from the maximum stiffness to the stiffness indicator below the maximum stiffness by 5 steps are selected. 36 patterns are set by a combination of the selected stiffness indicator range and the selected command response indicator range. In Step 4-2 (to be described later), the evaluation indicator is measured with respect to the set 36 patterns while the command response indicator and the stiffness indicator are sequentially changed. The stiffness indicator range and the command response indicator range in the set 36 patterns are used in Steps 2-2 and 3-2 (to be described later).

As needed basis, the number of combinations of the set patterns may be increased or decreased in accordance with a balance between measurement accuracy and measurement time. As illustrated in FIG. 10B, the combination is arrayed into a grid shape in the case that the stiffness indicator is set to a vertical axis while the command response indicator is set to a horizontal axis.

As illustrated in FIG. 9A, an optimum value of the friction compensation value that is of kinetic friction compensation processing 24c and viscous friction compensation processing 24d is searched in Steps 2-1 to 2-6, the friction compensation value being set before Step 1.

In Step 2-1, a friction compensation search stiffness indicator range and a friction compensation search command response indicator range are determined in searching the optimum value of the friction compensation value based on the stiffness indicator range and command response indicator range, which are determined in Step 1.

FIGS. 11A to 13B illustrate examples in which the friction compensation search stiffness indicator range and the friction compensation search command response indicator range are determined.

Figure 11B:
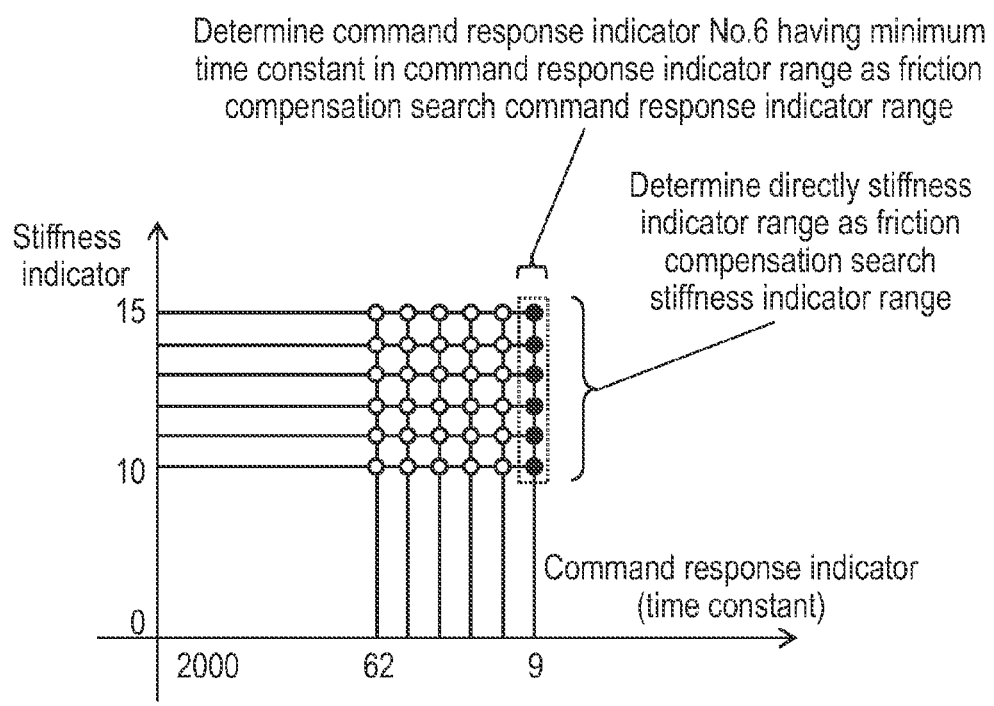
FIG. 11B is an explanatory view illustrating an example in which a friction compensation search stiffness indicator range is determined from a stiffness indicator range in the servo drive device according to the first exemplary embodiment of the present invention.
Figure 12B:
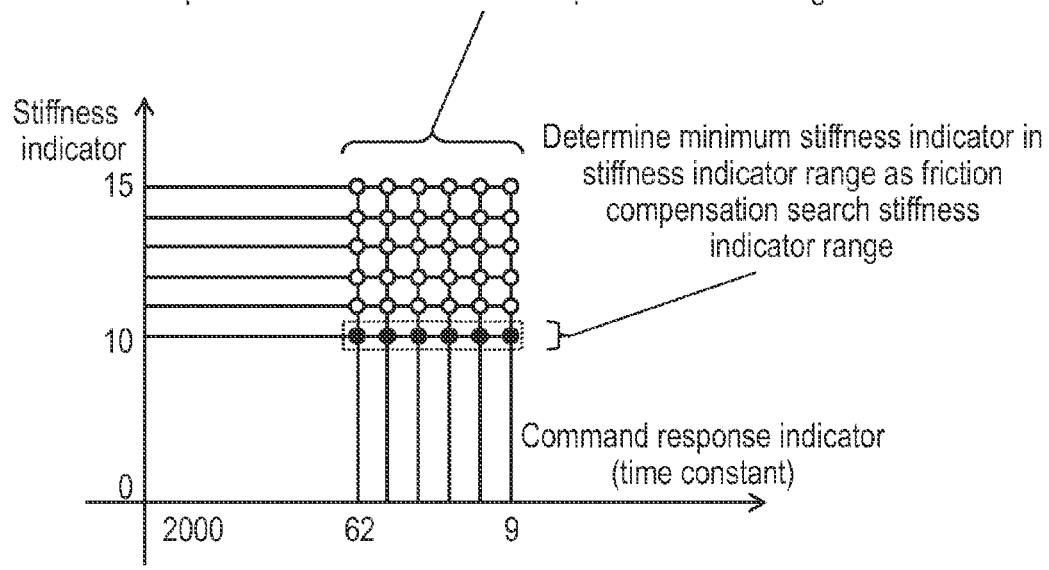
FIG. 12B is an explanatory view illustrating an example in which the friction compensation search stiffness indicator range is determined from a minimum stiffness indicator of the stiffness indicator range in the servo drive device according to the first exemplary embodiment of the present invention.
Figure 13B:
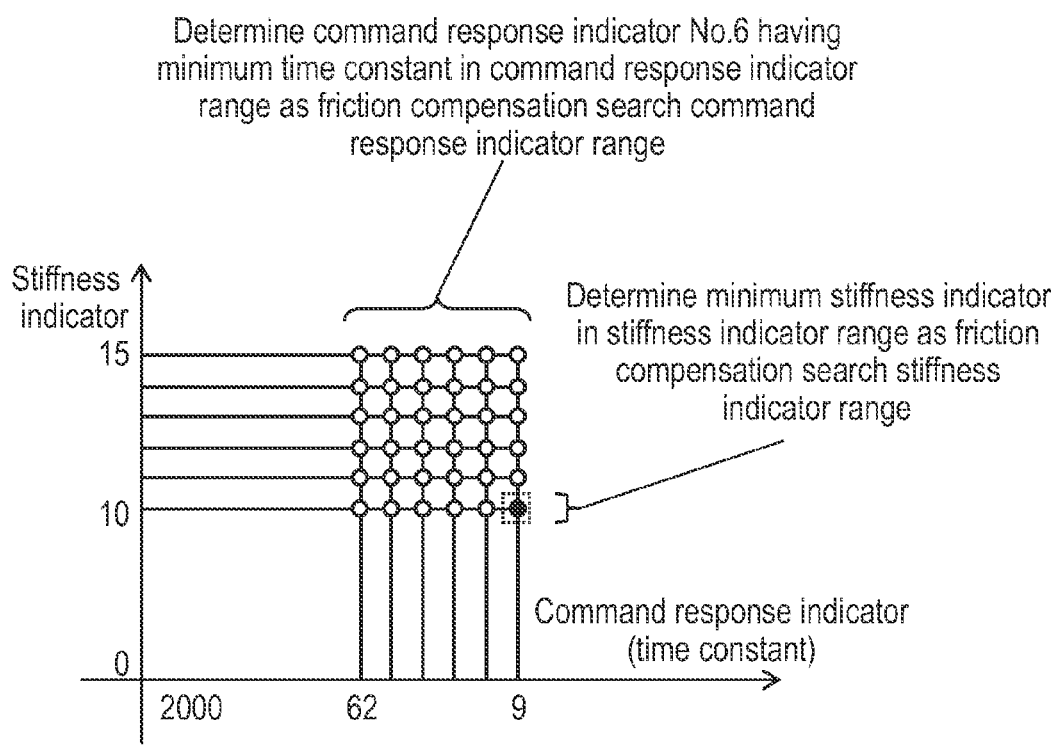
FIG. 13B is an explanatory view illustrating an example in which the friction compensation search stiffness indicator range is determined from the minimum stiffness indicator of the stiffness indicator range in the servo drive device according to the first exemplary embodiment of the present invention.

Specifically, FIGS. 11A, 12A, and 13A are explanatory views illustrating examples in which the command response indicator range is determined from the maximum stiffness in the servo drive device according to the first exemplary embodiment of the present invention. FIG. 11B is an explanatory view illustrating an example in which the friction compensation search stiffness indicator range is determined from the stiffness indicator range in the servo drive device according to the first exemplary embodiment of the present invention. FIG. 12B is an explanatory view illustrating an example in which the friction compensation search stiffness indicator range is determined from the minimum stiffness indicator of the stiffness indicator range in the servo drive device according to the first exemplary embodiment of the present invention. FIG. 13B is an explanatory view illustrating an example in which the friction compensation search stiffness indicator range is determined from the minimum stiffness indicator of the stiffness indicator range in the servo drive device according to the first exemplary embodiment of the present invention.

As illustrated in FIG. 11B, the stiffness indicator range is directly determined as the friction compensation search stiffness indicator range. In the command response indicator range, command response indicator NO. 6 having the minimum time constant is determined as the friction compensation search command response indicator range.

6 patterns are set based on the determined friction compensation search stiffness indicator range and friction compensation search command response indicator range. In Step 2-2 (to be described later), the optimum value of the friction compensation value is searched with respect to the set 6 patterns while the patterns are sequentially changed.

As illustrated in FIG. 12B, the minimum stiffness indicator in the stiffness indicator range is determined as the friction compensation search stiffness indicator range. Command response indicators NO. 1 to NO. 6 that are of the command response indicator range are directly determined as the friction compensation search command response indicator range.

6 patterns are set based on the determined friction compensation search stiffness indicator range and friction compensation search command response indicator range. In Step 2-2 (to be described later), the optimum value of the friction compensation value is searched with respect to the set 6 patterns while the patterns are sequentially changed.

As illustrated in FIG. 13B, the minimum stiffness indicator in the stiffness indicator range is determined as the friction compensation search stiffness indicator range. In the command response indicator range, command response indicator NO. 6 having the minimum time constant is determined as the friction compensation search command response indicator range.

The optimum value of the friction compensation value is searched with respect to the 1 pattern that is determined by the friction compensation search stiffness indicator range and the friction compensation search command response indicator range.

In the specific example, the friction compensation search stiffness indicator range is set narrower than the stiffness indicator range. The friction compensation search command response indicator range is set narrower than the command response indicator range.

Alternatively, the stiffness indicator range is set to the friction compensation search stiffness indicator range, the command response indicator range is set to the friction compensation search command response indicator range, and the optimum value of the friction compensation value may be searched in all the combination patterns. That is, as needed basis, the range where the optimum value of the friction compensation value is searched may be expanded in accordance with the balance with the measurement time.

As illustrated in FIG. 9A, in Step 2-2, the combination of the stiffness indicator and the command response indicator is changed depending on the combination pattern of the friction compensation search stiffness indicator range and the friction compensation search command response indicator range, which are determined in Step 2-1, before the actual operation is performed in Step 2-3 (to be described later). Command response setting unit 22 is set by command response setting function 221 in accordance with the command response indicator. Position and speed controller 23 is set by stiffness setting function 231 in accordance with the stiffness indicator.

In Step 2-3, the motor is driven in accordance with the operation pattern determined before Step 1. The evaluation indicator is measured by evaluation indicator measuring function 27. Examples of the evaluation indicator include the settling time associated with the positioning accuracy, the overshoot amount, and the number of INP changing times. When a storage capacity of storage 28 has no limitation, desirably the evaluation indicators are collected as many as possible. The measurement result is stored in storage 28 together with the friction compensation value while correlated with the combination pattern of the stiffness indicator and the command response indicator.

As illustrated in FIGS. 1A and 1B, when the measurement result can be stored, storage 28 may be provided distant from the basic function of driving motor 3.

Whether the search is completed with respect to the optimum value of the friction compensation value is decided in Step 2-4. The flowchart goes to Step 2-6 when the search is completed. The flowchart goes to Step 2-5 unless the search is completed.

In Step 2-5, the estimated values of the kinetic friction and viscous friction coefficient are changed. In Step 2-5, kinetic friction compensation processing 24c and viscous friction compensation processing 24d are reset. The estimated value may be changed by adding or subtracting an operation amount, in which the load characteristic measured before Step 1 is multiplied by a given scaling factor, to or from the present estimated value. The flowchart returns to Step 2-3 when the change is completed. In Step 2-3, the motor is driven again in accordance with the operation pattern determined before Step 1. The evaluation indicator is measured by evaluation indicator measuring function 27.

Whether the search of the optimum value of the friction compensation value is completed with respect to all the combinations of the friction compensation search stiffness indicator range and friction compensation search command response indicator range, which are determined in Step 2-1, is decided in Step 2-6. The flowchart returns to Step 2-2 unless the search is completed. In Step 2-2, the combination of the stiffness indicator and the command response indicator is changed again. The flowchart goes to Step 3-1 when all the searches are completed.

The reason why the friction compensation search stiffness indicator range and the friction compensation search command response indicator range are determined through the processes in FIGS. 11A to 13B in Step 2-1 will be described with reference to FIGS. 14A to 15C.

Figure 14A:
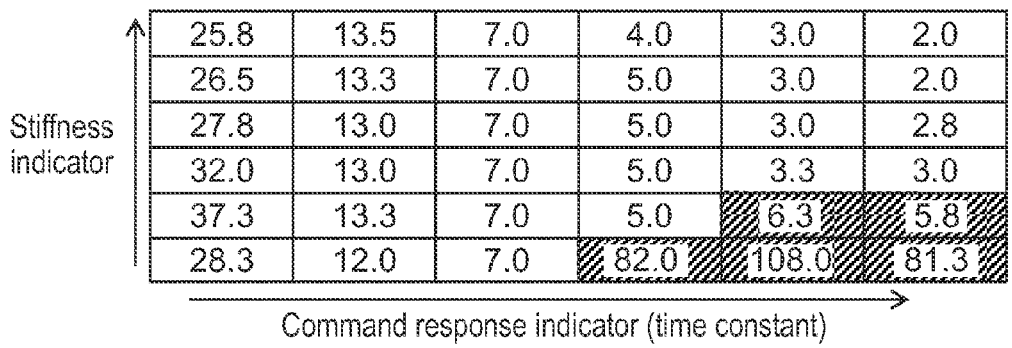
FIG. 14A is an explanatory view illustrating an evaluation indicator measurement result of a positioning settling time combination pattern in the stiffness indicator range and the command response indicator range in the servo drive device according to the first exemplary embodiment of the present invention.
Figure 14B:
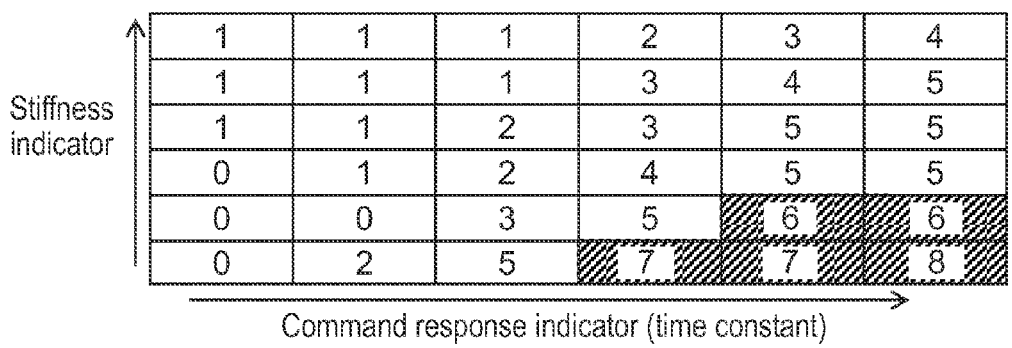
FIG. 14B is an explanatory view illustrating the evaluation indicator measurement result of an overshoot amount combination pattern in the stiffness indicator range and the command response indicator range in the servo drive device according to the first exemplary embodiment of the present invention.
Figure 14C:
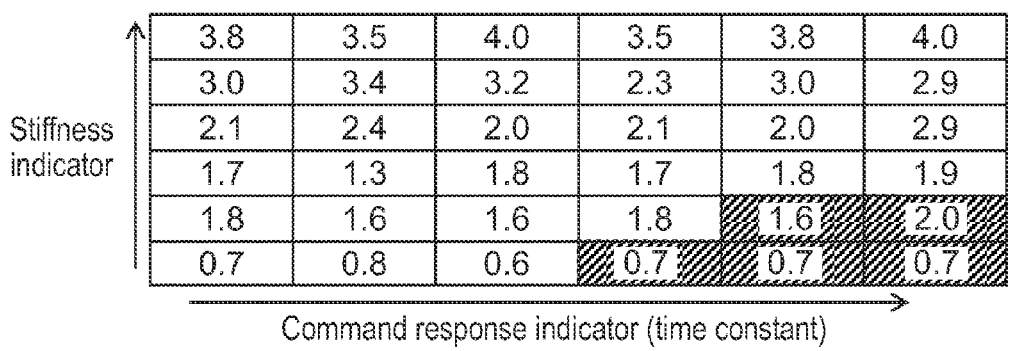
FIG. 14C is an explanatory view illustrating the evaluation indicator measurement result of a vibration level combination pattern in the stiffness indicator range and the command response indicator range in the servo drive device according to the first exemplary embodiment of the present invention.

FIG. 14A is an explanatory view illustrating an evaluation indicator measurement result of a positioning settling time combination pattern in the stiffness indicator range and the command response indicator range in the servo drive device according to the first exemplary embodiment of the present invention. FIG. 14B is an explanatory view illustrating the evaluation indicator measurement result of an overshoot amount combination pattern in the stiffness indicator range and the command response indicator range in the servo drive device according to the first exemplary embodiment of the present invention. FIG. 14C is an explanatory view illustrating the evaluation indicator measurement result of a vibration level combination pattern in the stiffness indicator range and the command response indicator range in the servo drive device according to the first exemplary embodiment of the present invention.

Figure 15A:
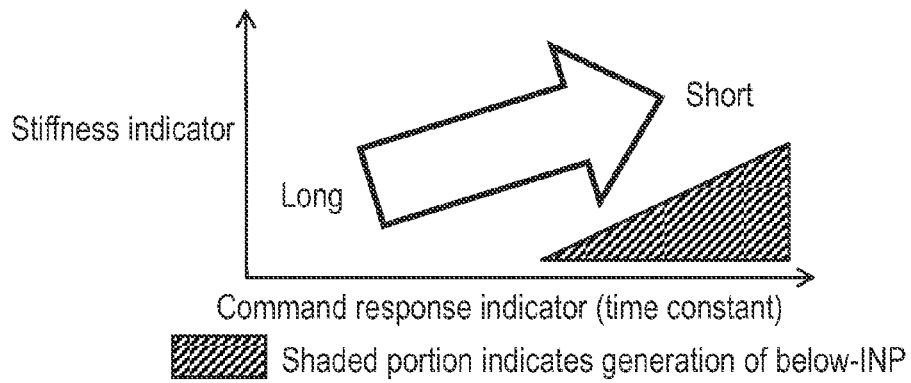
FIG. 15A is an explanatory view illustrating an evaluation indicator tendency of the positioning settling time combination pattern in the stiffness indicator range and the command response indicator range in the servo drive device according to the first exemplary embodiment of the present invention.
Figure 15B:
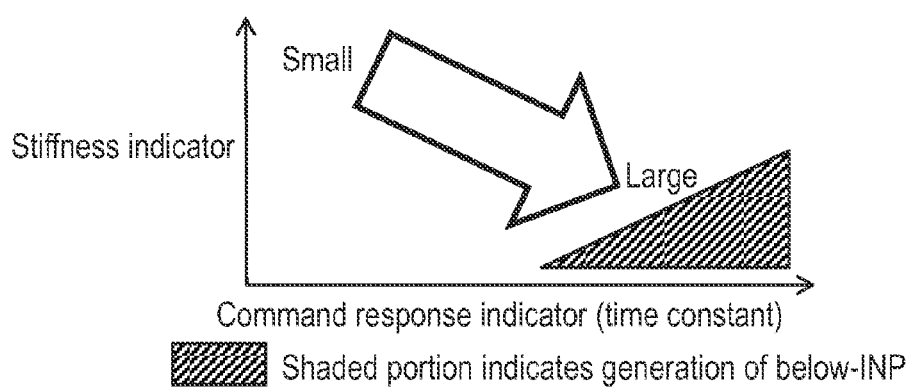
FIG. 15B is an explanatory view illustrating the evaluation indicator tendency of the overshoot amount combination pattern in the stiffness indicator range and the command response indicator range in the servo drive device according to the first exemplary embodiment of the present invention.
Figure 15C:
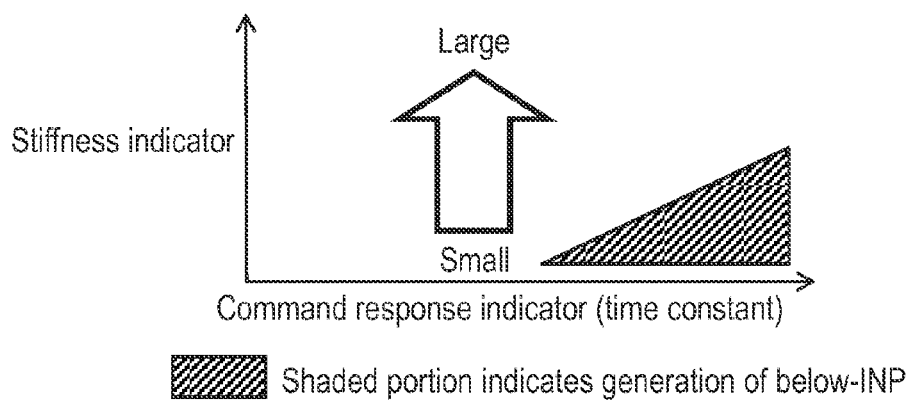
FIG. 15C is an explanatory view illustrating the evaluation indicator tendency of the vibration level combination pattern in the stiffness indicator range and the command response indicator range in the servo drive device according to the first exemplary embodiment of the present invention.

FIG. 15A is an explanatory view illustrating an evaluation indicator tendency of the positioning settling time combination pattern in the stiffness indicator range and the command response indicator range in the servo drive device according to the first exemplary embodiment of the present invention. FIG. 15B is an explanatory view illustrating the evaluation indicator tendency of the overshoot amount combination pattern in the stiffness indicator range and the command response indicator range in the servo drive device according to the first exemplary embodiment of the present invention. FIG. 15C is an explanatory view illustrating the evaluation indicator tendency of the vibration level combination pattern in the stiffness indicator range and the command response indicator range in the servo drive device according to the first exemplary embodiment of the present invention.

FIGS. 14A to 14C illustrate the actually-measured results of the positioning settling time, the overshoot amount, and the vibration level in the combination pattern of the stiffness indicator range and the command response indicator range.

As illustrated in FIG. 14A, the time until the positional deviation falls within the positioning completion range after the external position command stops is lengthened with increasing numerical value indicating the positioning settling time. As illustrated in FIG. 14B, an amount going too far the target position increases with increasing numerical value indicating the overshoot amount. As illustrated in FIG. 14C, with increasing numerical value indicating the vibration level, an amplitude of the vibration component increases with respect to the positional deviation.

A shaded portion means generation of below-positioning completion output signal (below-INT) through the following process. That is, the positional deviation falls within the positioning completion range after the external position command stops. Then, the positional deviation is out of the positioning completion range because the amount goes too far the target position. Then, the positional deviation falls within the positioning completion range again.

In the actually-measured present case, the positioning completion range is set to 5. Therefore, as illustrated in FIG. 14B, it is found that the below-INP is generated when the overshoot amount is greater than or equal to 6.

The generation of the below-INP can also be decided from the number of positioning completion output signal changing times. The below-INP is not generated when the number of positioning completion output signal changing times is once since the external position command stops. The below-INP is generated when the number of positioning completion output signal changing times is at least twice since the external position command stops.

FIG. 15A illustrates a tendency that can be seen from the measurement result in FIG. 14A with respect to the positioning settling time in the combination pattern of the stiffness indicator range and the command response indicator range.

The command responsiveness has a dominant influence on the positioning settling time. Therefore, the positioning settling time is shortened with increasing command response indicator, namely, with decreasing time constant. The stiffness indicator has a little influence on the positioning settling time. However, the positioning settling time is shortened with increasing stiffness indicator.

FIG. 15B illustrates a tendency that can be seen from the measurement result in FIG. 14B with respect to the overshoot amount in the combination pattern of the stiffness indicator range and the command response indicator range.

The overshoot amount increases with decreasing stiffness indicator. The overshoot amount increases with increasing command response indicator, namely, with decreasing time constant.

FIG. 15C illustrates a tendency that can be seen from the measurement result in FIG. 14C with respect to the vibration level in the combination pattern of the stiffness indicator range and the command response indicator range.

The disturbance responsiveness has a dominant influence on the vibration level. Therefore, the vibration level increases with increasing stiffness indicator. The command response indicator has a little influence on the vibration level.

The friction compensation value changing method in Step 2-5 of FIG. 9A will be described with reference to FIG. 16.

Figure 16:
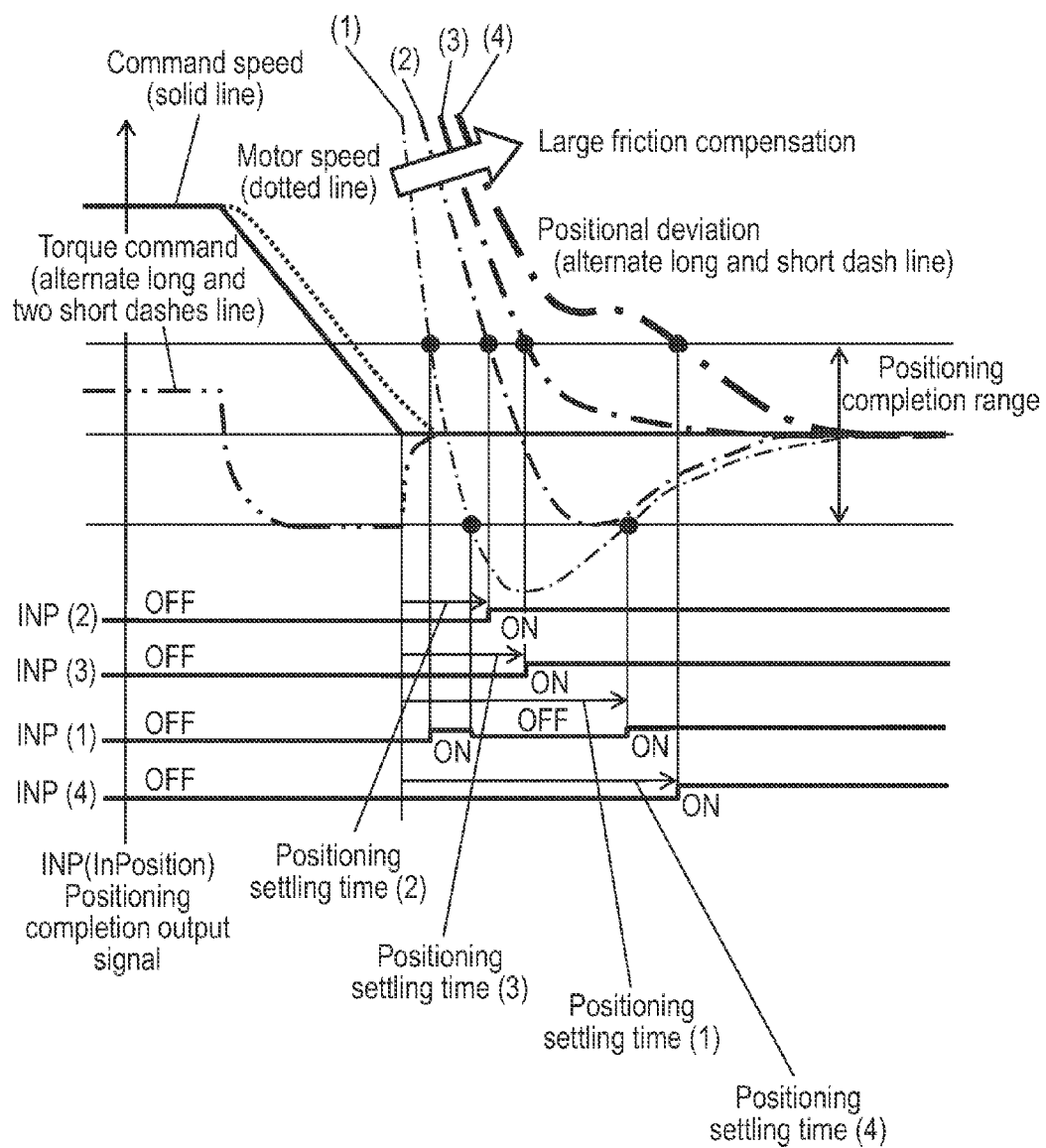
FIG. 16 is an explanatory view illustrating a positional deviation in accordance with a friction compensation value during positioning settling in the servo drive device according to the first exemplary embodiment of the present invention.

FIG. 16 is an explanatory view illustrating the positional deviation corresponding to the friction compensation value during the positioning settling in the servo drive device according to the first exemplary embodiment of the present invention.

When the friction compensation value decreases excessively, the positional deviation becomes the state shown as (1). In this case, the below-INP is generated because of the large overshoot amount.

When the friction compensation value is increased, the positional deviation becomes the state shown as (2). In this case, the overshoot amount falls within the positioning completion range. The positioning settling time becomes the shortest.

When the friction compensation value is further increased, the positional deviation becomes the state shown as (3) or (4). In these cases, the overshoot is not generated. The positioning settling time becomes longer than the state shown as (2) of the positional deviation.

Thus, in Step 2-5, it is found that the friction compensation value is changed as follows.

In the case that the overshoot is acceptable, the friction compensation value is increased when the below-INP is generated. The friction compensation value is decreased unless the below-INP is generated. This adjustment is repeated with respect to the generation of the below-INP and non-generation of the below-INP until the change is generated.

In the case that the overshoot is unacceptable, the friction compensation value is increased when the overshoot is generated. The friction compensation value is decreased unless the overshoot is generated. This adjustment is repeated with respect to the generation of the overshoot and the non-generation of the overshoot until the change is generated.

As is clear from the above description, the following combinations (a) to (c) are formed with respect to the overshoot amount, the command response indicator, and the stiffness indicator. There are combinations of three conditions, namely, (a) the overshoot amount is large, (b) the command response indicator is large, and (c) the stiffness indicator is small.

When the friction compensation value is optimally adjusted using the combinations, the measurement result can be obtained with non-existence of the below-INP or non-existence of the overshoot in all the combinations of the stiffness indicator range and the command response indicator range. Therefore, the option can be expanded when the worker selects the finial adjustment result.

The combination of the large command response indicator and the small stiffness indicator can be selected. Therefore, when controlling the servo motor, the worker can obtain the high-stability adjustment result without lengthening excessively the positioning settling time.

Additionally, motor drive device 2 of the first exemplary embodiment of the present invention performs the following operation, before motor drive device 2 drives motor 3 while sequentially changing command response indicators 61 and stiffness indicators 62 in accordance with generated evaluation indicator measuring pattern 63.

In evaluation indicator measuring pattern 63, a vibration control measuring pattern is determined by the combination of stiffness indicator 62 maximizing the responsiveness and command response indicator 61 corresponding to stiffness indicator 62 maximizing the responsiveness.

Motor 3 is driven using command response setting function 221 and stiffness setting function 231. In the vibration control measuring pattern, the positioning indicator is measured and the measurement result is stored.

In the vibration control measuring pattern, the vibration control frequency and depth setting value at which the positioning indicator becomes the best is searched, and the search result is stored.

At least one of the positioning settling time, the vibration level, and the vibration frequency can be used as the positioning indicator.

The vibration control frequency and the depth setting value are searched by increasing or decreasing the depth setting value such that the positioning indicator becomes the best. The vibration control frequency and the depth setting value are searched by repeatedly increasing or decreasing the depth setting value in the direction in which the positioning indicator becomes better.

In the motor drive device according to the first exemplary embodiment of the present invention, the measurement result having the low vibration level can be obtained in all the patterns within the measurement range. Therefore, the option can be expanded when the worker selects the finial adjustment result.

The software configuration will mainly be described in detail below with reference to FIGS. 9B, and 17A to 18.

As illustrated in FIG. 9B, the optimum values of the vibration control frequency and depth setting are searched in Steps 3-1 to 3-6.

In Step 3-1, a vibration control search stiffness indicator range and vibration control search command response indicator range are determined in searching the optimum values of the vibration control frequency and depth setting based on the stiffness indicator range and command response indicator range, which are determined in Step 1. At this point, an initial value of the vibration control frequency is set to a frequency at which the vibration control filter is disabled. An initial value of the depth setting is set to a depth in which a relationship of output with respect to input of the vibration control filter becomes zero time.

When proper rough values are well known for the vibration control frequency and the depth setting, the rough values may be used as the initial value.

Figure 17B:
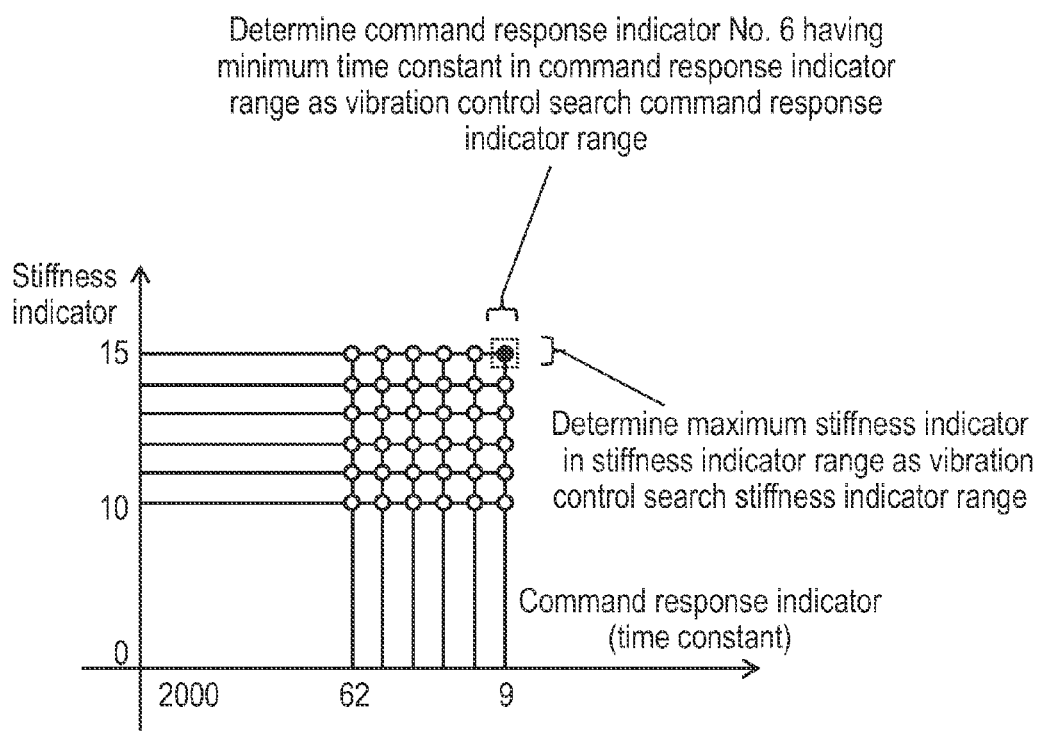
FIG. 17B is an explanatory view illustrating an example in which a vibration control search stiffness indicator range is determined from a maximum stiffness indicator of the stiffness indicator range in the servo drive device according to the first exemplary embodiment of the present invention.

FIG. 17A is an explanatory view illustrating an example in which the command response indicator range is determined from the maximum stiffness in the servo drive device according to the first exemplary embodiment of the present invention. FIG. 17B is an explanatory view illustrating an example in which the vibration control search stiffness indicator range is determined from the maximum stiffness indicator of the stiffness indicator range in the servo drive device according to the first exemplary embodiment of the present invention.

As illustrated in FIG. 17B, the maximum stiffness indicator in the stiffness indicator range is determined as the vibration control search stiffness indicator range. In the command response indicator range, command response indicator NO. 6 having the minimum time constant is determined as the vibration control search command response indicator range.

The optimum values of the vibration control frequency and depth setting are searched with respect to the 1 pattern that is determined by the vibration control search stiffness indicator range and the vibration control search command response indicator range.

In the specific example, the vibration control search stiffness indicator range is set narrower than the stiffness indicator range. The vibration control search command response indicator range is set narrower than the command response indicator range.

Alternatively, the stiffness indicator range is set to the vibration control search stiffness indicator range, the command response indicator range is set to the vibration control search command response indicator range, and the optimum values of the vibration control frequency and depth setting may be searched in all the combination patterns. That is, as needed basis, the range where the optimum values of the vibration control frequency and depth setting are searched may be expanded in accordance with the balance with the measurement time.

As illustrated in FIG. 9B, in Step 3-2, the combination of the stiffness indicator and the command response indicator is changed depending on the combination pattern of the vibration control search stiffness indicator range and the vibration control search command response indicator range, which are determined in Step 3-1, before the actual operation is performed in Step 3-3 (to be described later). Command response setting unit 22 is set by command response setting function 221 in accordance with the command response indicator. Position and speed controller 23 is set by stiffness setting function 231 in accordance with the stiffness indicator.

In Step 3-3, the motor is driven in accordance with the operation pattern determined before Step 1. The evaluation indicator is measured by evaluation indicator measuring function 27. Examples of the evaluation indicator include the settling time associated with the positioning accuracy, the overshoot amount, the number of INP changing times, the vibration level, and the vibration frequency. When a storage capacity of storage 28 has no limitation, desirably the evaluation indicators are collected as many as possible. The measurement result is stored in storage 28 together with the vibration control frequency and the depth setting while correlated with the combination pattern of the stiffness indicator and the command response indicator.

As illustrated in FIGS. 1A and 1B, when the measurement result can be stored, storage 28 may be provided distant from the basic function of driving motor 3.

Whether the search is completed with respect to the optimum values of the vibration control frequency and depth setting is decided in Step 3-4. The flowchart goes to Step 3-6 when the search is completed. The flowchart goes to Step 3-5 unless the search is completed.

In Step 3-5, the vibration control frequency and the depth setting are changed. In Step 3-5, the frequency characteristic of vibration control filter 22d is changed through vibration control filter setting processing 221d. The vibration control frequency may be changed by setting the vibration frequency of the evaluation indicator to the vibration control frequency. The depth setting may be changed such that the depth is shallowed until the relationship of the output to the input of the vibration control filter becomes from zero time to 1 time. For example, the depth setting may be changed such that the depth is shallowed at constant intervals such as 0.1 time and 0.01 time. The flowchart returns to Step 3-3 when the change is completed. In Step 3-3, the motor is driven again in accordance with the operation pattern determined before Step 1. The evaluation indicator is measured by evaluation indicator measuring function 27.

Whether the search of the optimum values of the vibration control frequency and depth setting is completed with respect to all the combinations of the vibration control search stiffness indicator range and vibration control search command response indicator range, which are determined in Step 3-1, is decided in Step 3-6. The flowchart returns to Step 3-2 unless the search is completed. In Step 3-2, the combination of the stiffness indicator and the command response indicator is changed again. The flowchart goes to Step 4-1 when all the searches are completed.

The reason why the vibration control search stiffness indicator range and the vibration control search command response indicator range are determined through the processes in FIGS. 17A and 17B in Step 3-1 will be described with reference to FIGS. 14A to 15C, and 18.

The vibration level in changing the stiffness indicator and the command response indicator is described above with reference to FIGS. 14A to 15C. That is, the vibration level increases with increasing stiffness indicator. The command response indicator has a little influence on the vibration level.

Figure 18:
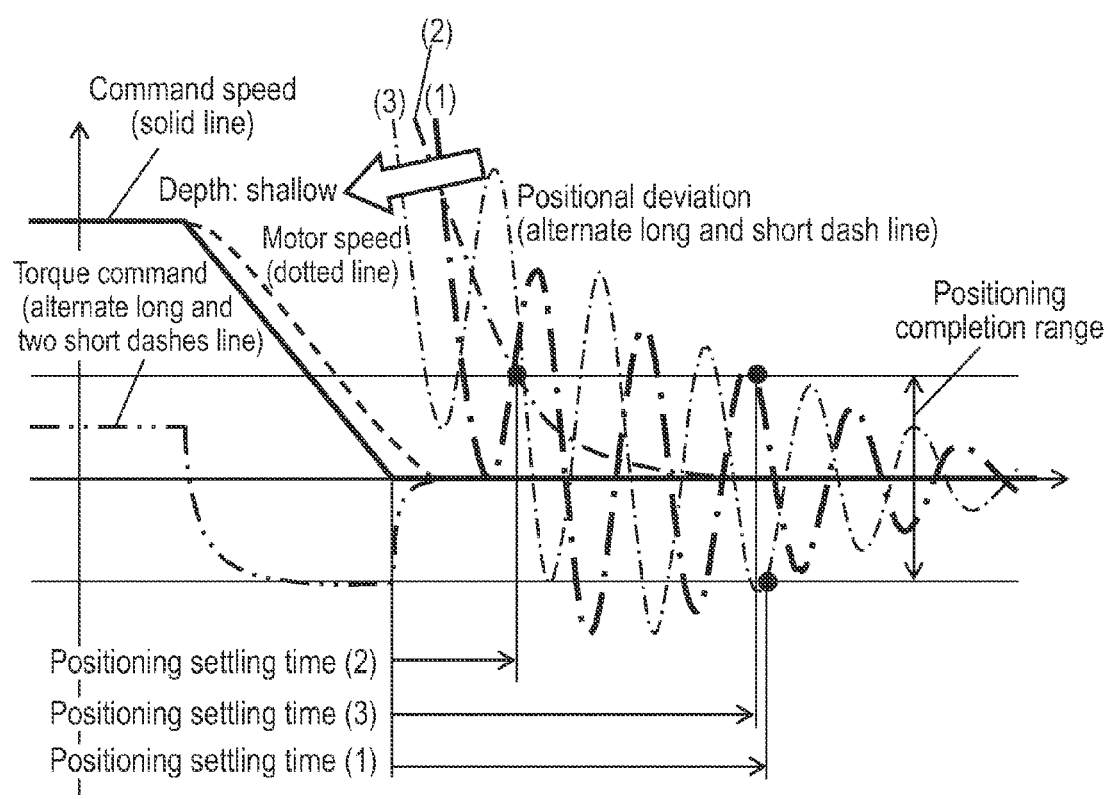
FIG. 18 is an explanatory view illustrating the positional deviation in accordance with a depth setting of a vibration control filter during the positioning settling in the servo drive device according to the first exemplary embodiment of the present invention.

FIG. 18 is an explanatory view illustrating the positional deviation in accordance with a depth setting of the vibration control filter during the positioning settling in the servo drive device according to the first exemplary embodiment of the present invention.

The depth setting of the vibration control filter is shallowed in the case that the vibration frequency of the positional deviation is correctly set as the vibration control frequency. That is, the output to the input of the vibration control filter is brought close to 1 time. In this case, the vibration component is not completely removed, but the positional deviation becomes the vibration state as indicated by (3).

The depth of the vibration control filter is set deeper. That is, the output to the input of the vibration control filter is brought close to zero time. In this case, the delay of the response increases when the vibration component is excessively removed. The positional deviation becomes the vibration state as indicated by (1).

Then, the depth setting of the vibration control filter is properly performed. In this case, the vibration component is properly removed. The vibration is eliminated as indicated by (2).

When the vibration of the positional deviation increases, the positioning settling time becomes the positioning settling times (1) and (3) longer than the positioning settling time (2) due to the generation of the below-INP.

Thus, in Step 3-5, it is found that the depth setting of the vibration control filter is changed as follows.

The depth is gradually shallowed such that the depth setting comes close to 1 time in the case that the initial value of the depth setting of the vibration control filter is set to the depth in which the relationship of the output with respect to the input of the vibration control filter becomes zero time.

The depth setting is shallowed or deepened in the direction in which the vibration level is reduced in the case that the initial value of the depth setting of the vibration control filter is not set to the depth in which the relationship of the output with respect to the input of the vibration control filter becomes zero time. The adjustment is repeated until the vibration level is changed from the decrease to the increase.

The variation in vibration frequency is not basically generated when the depth setting of the vibration control filter is changed. Therefore, the vibration control frequency may be set by extracting the vibration frequency from the vibration component of the positional deviation. The vibration control frequency may be set only for the first time. Alternatively, the vibration control frequency may be reset every time the change of the depth setting is generated.

As is clear from the above description, the following combinations (a) and (b) are formed with respect to the vibration level and the stiffness indicator. There is a combination of two conditions, namely, (a) the vibration level is large and (b) the stiffness indicator is large.

When the vibration control frequency and the depth setting are optimally adjusted using the combination, the measurement result can be obtained with the small vibration level in all the combinations of the stiffness indicator range and the command response indicator range. Therefore, the option can be expanded when the worker selects the finial adjustment result.

The order of Steps 2-1 to 2-6 and Steps 3-1 to 3-6 may be reversed.

As illustrated in FIG. 9B, in Steps 4-1 to 4-3, the evaluation indicator is measured with respect to all the combination patterns of the stiffness indicator range and command response indicator range, which are determined in Step 1.

In Step 4-1, the combination of the stiffness indicator and the command response indicator is changed based on the stiffness indicator range and command response indicator range, which are determined in Step 1, before the operation is actually performed in Step 4-2. Command response setting unit 22 is set by command response setting function 221 in accordance with the command response indicator. Position and speed controller 23 is set by stiffness setting function 231 in accordance with the stiffness indicator.

The estimated values of the kinetic friction and viscous friction coefficient are changed based on the optimum value of the friction compensation value in the combination of the stiffness indicator and command response indicator, which are searched in Steps 2-1 to 2-6. Kinetic friction compensation processing 24c and viscous friction compensation processing 24d are set based on the optimum value of the friction compensation value.

In Step 4-2, the motor is driven in accordance with the operation pattern determined before Step 1. The evaluation indicator of each operation is measured by evaluation indicator measuring function 27. Examples of the evaluation indicator include the settling time associated with the positioning accuracy, the overshoot amount, the number of INP changing times, and the vibration level. When a storage capacity of storage 28 has no limitation, desirably the evaluation indicators are collected as many as possible. The measurement result is stored in storage 28 while correlated with the combination pattern of the stiffness indicator and the command response indicator.

In Step 4-3, it is determined whether the measurement is completed with respect to all the combination patterns of the stiffness indicator range and command response indicator range or not, which are determined in Step 1. The flowchart returns to Step 4-1 unless the measurement is completed. In Step 4-1, the combination of the stiffness indicator and the command response indicator is changed again. The flowchart goes to Step 5 when the measurement is completed.

As illustrated in FIG. 9B, a recommended condition is selected in Step 5. The recommended condition is selected from the previously-defined options in accordance with the application. The recommended condition may be selected in a graphical manner while a graph of the evaluation indicator is displayed. Alternatively, in the recommended condition, the evaluation indicator is displayed with respect to a matrix of the command response indicator and the stiffness indicator. In the recommended condition, the combination of the command response indicator and the stiffness indicator may directly be designated. When the evaluation indicator is displayed with respect to the matrix of the command response indicator and the stiffness indicator, the tendency of the evaluation indicator can be understood in changing the stiffness indicator or the command response indicator.

In other words, any method can be adopted as long as at least one candidate is selected from the combination pattern of the command response indicator and the stiffness indicator.

As illustrated in FIG. 9B, in Step 6, based on the evaluation indicator measurement result in Steps 4-1 to 4-3, the highest-priority combination of the command response indicator and the stiffness indicator is selected as the final adjustment result in accordance with the recommended condition selected in Step 5. Candidates having the second priority or below may be indicated in the case that the recommended condition includes a sorting condition.

When the evaluation indicator is displayed with respect to the matrix of the command response indicator and the stiffness indicator, the combination of the command response indicator and the lower stiffness indicator is selected while the requirement is satisfied. When controlling the servo motor, the worker can obtain the high-stability adjustment result.

Finally, all the automatic adjustment functions of motor drive device 2 are disabled, and Step 6 is ended.

In command response setting function 221, the reflection starting signal is turned off such that the command response indicator is not reflected in actual command response setting unit 22. In stiffness setting function 231, the reflection starting signal is turned off such that the stiffness indicator is not reflected in actual position and speed controller 23.

INDUSTRIAL APPLICABILITY

In the motor drive device of the present invention, even the worker who does not have the sufficient knowledge or experience about the servo adjustment can obtain easily the high-stability adjustment result while satisfying the evaluation indicator depending on the application.

The invention claimed is:

1. A motor drive device that drives a motor, the motor drive device comprising:
   a command response setting unit that receives a position command, performs filter processing of removing a specific frequency band, and transmits a result of the filter processing as a post-filter position command;
   a position and speed controller that receives the post-filter position command and motor positional information transmitted from an encoder, generates a torque command such that a deviation between the post-filter position command and the motor positional information becomes zero, and transmits the generated torque command;
   a load characteristic compensator that receives the torque command, multiplies the torque command by inertia estimated values of the motor and a load applied to the motor, adds a friction torque estimated value of the load, generates a post-compensation torque command to drive the motor, and transmits the generated post-compensation torque command;
   a servo adjuster that stores a plurality of command response indicators and a plurality of stiffness indicators, and generates an evaluation indicator measuring pattern by a combination of each of the command response indicators and each of the stiffness indicators;
   a command response setting function that automatically sets a filter characteristic of the command response setting unit in accordance with the command response indicator constituting the evaluation indicator measuring pattern, the command response indicator being transmitted from the servo adjuster;
   a stiffness setting function that automatically sets a parameter of the position and speed controller in accordance with the stiffness indicator constituting the evaluation indicator measuring pattern, the stiffness indicator being transmitted from the servo adjuster;
   an evaluation indicator measuring function that automatically measures an evaluation indicator derived from at least one of the position command, the motor positional information, and the post-compensation torque command; and
   a storage in which a result measured by the evaluation indicator measuring function is stored,
   wherein the motor is driven in accordance with the generated evaluation indicator measuring pattern while the command response indicators and the stiffness indicators are sequentially changed.

2. The motor drive device according to claim 1, wherein at least one of a positioning settling time, an overshoot amount, a vibration level, and a number of positioning completion output signal changing times is used as the evaluation indicator.

3. The motor drive device according to claim 1, wherein, before the motor is driven in accordance with the generated evaluation indicator measuring pattern while the command response indicators and the stiffness indicators are sequentially changed,
   a first friction compensation measuring pattern is determined in the evaluation indicator measuring pattern by a combination of the command response indicator in which a time constant is minimized and the stiffness indicator corresponding to the command response indicator in which the time constant is minimized, and
   using the command response setting function and the stiffness setting function, the motor is driven while the stiffness indicators are sequentially changed, a positioning indicator is measured and stored in each combination, and a friction compensation value such that the positioning indicator becomes the best in each first friction compensation measuring pattern is searched and stored.

4. The motor drive device according to claim 3, wherein at least one of a positioning settling time, an overshoot amount, and a number of positioning completion output signal changing times is used as the positioning indicator.

5. The motor drive device according to claim 3, wherein the friction compensation value is increased or decreased to perform the search such that the positioning indicator becomes the best.

6. The motor drive device according to claim 1, wherein, before the motor is driven in accordance with the generated evaluation indicator measuring pattern while the command response indicators and the stiffness indicators are sequentially changed,
   a second friction compensation measuring pattern is determined in the evaluation indicator measuring pattern by a combination of the stiffness indicator in which responsiveness is the lowest and the command response indicator corresponding to the stiffness indicator in which the responsiveness is the lowest, and
   using the command response setting function and the stiffness setting function, the motor is driven while the command response indicators are sequentially changed, a positioning indicator is measured and stored in each combination, and a friction compensation value such that the positioning indicator becomes the best in each second friction compensation measuring pattern is searched and stored.

7. The motor drive device according to claim 6, wherein at least one of a positioning settling time, an overshoot amount, and a number of positioning completion output signal changing times is used as the positioning indicator.

8. The motor drive device according to claim 6, wherein the friction compensation value is increased or decreased to perform the search such that the positioning indicator becomes the best.

9. The motor drive device according to claim 1, wherein, before the motor is driven in accordance with the generated evaluation indicator measuring pattern while the command response indicators and the stiffness indicators are sequentially changed, a third friction compensation measuring pattern is determined in the evaluation indicator measuring pattern by a combination of the command response indicator in which a time constant is minimized and the stiffness indicator in which responsiveness is the lowest, and using the command response setting function and the stiffness setting function, the motor is driven to measure and store a positioning indicator, and a friction compensation value such that the positioning indicator becomes the best in the third friction compensation measuring pattern is searched and stored.

10. The motor drive device according to claim 9, wherein at least one of a positioning settling time, an overshoot amount, and a number of positioning completion output signal changing times is used as the positioning indicator.

11. The motor drive device according to claim 9, wherein the friction compensation value is increased or decreased to perform the search such that the positioning indicator becomes the best.

12. The motor drive device according to claim 1, wherein, before the motor is driven in accordance with the generated evaluation indicator measuring pattern while the command response indicators and the stiffness indicators are sequentially changed, a vibration control measuring pattern is determined in the evaluation indicator measuring pattern by a combination of the stiffness indicator in which responsiveness is the highest and the command response indicator corresponding to the stiffness indicator in which the responsiveness is the highest, and using the command response setting function and the stiffness setting function, the motor is driven to measure and store a positioning indicator, and a vibration control frequency and a depth setting value such that the positioning indicator becomes the best in the vibration control measuring pattern are searched and stored.

13. The motor drive device according to claim 12, wherein at least one of a positioning settling time, a vibration level, and a vibration frequency is used as the positioning indicator.

14. The motor drive device according to claim 12, wherein the depth setting value is searched by being increased or decreased such that the positioning indicator becomes the best.

* * * * *